United States Patent
Wang et al.

(10) Patent No.: US 11,713,409 B2
(45) Date of Patent: Aug. 1, 2023

(54) SUBSTITUTED SACCHARIDES OR GLYCOSIDES AND USE THEREOF IN A DRILLING FLUID COMPOSITION

(71) Applicants: China Petroleum & Chemical Corporation, Beijing (CN); Sinopec Petroleum Engineering Technology Service Co., Ltd., Beijing (CN); Drilling Engineering Technology Research Inst. of Sinopec Zhongyuan Petroleum Engineering Co., LTD, Henan (CN); Sinopec Zhongyuan Petroleum Engineering Co., LTD, Henan (CN)

(72) Inventors: Zhonghua Wang, Henan (CN); Xiqiang Si, Henan (CN)

(73) Assignees: China Petroleum & Chemical Corporation, Beijing (CN); Sinopec Petroleum Engineering Technology Service Co., Ltd., Beijing (CN); Drilling Engineering Technology Research Inst. of Sinopec Zhongyuan Petroleum Engineering Co., LTD, Henan (CN)

(*) Notice: Subject to any disclaimer, the term of this patent is extended or adjusted under 35 U.S.C. 154(b) by 66 days.

(21) Appl. No.: 16/768,639

(22) PCT Filed: Jul. 5, 2019

(86) PCT No.: PCT/CN2019/094909
§ 371 (c)(1),
(2) Date: May 29, 2020

(87) PCT Pub. No.: WO2020/007366
PCT Pub. Date: Jan. 9, 2020

(65) Prior Publication Data
US 2021/0179913 A1    Jun. 17, 2021

(30) Foreign Application Priority Data
Jul. 6, 2018    (CN) .......................... 201810734568.4

(51) Int. Cl.
*C09K 8/12*    (2006.01)
*C09K 8/03*    (2006.01)
(Continued)

(52) U.S. Cl.
CPC ............... *C09K 8/12* (2013.01); *C09K 8/032* (2013.01); *C09K 8/035* (2013.01); *C09K 8/10* (2013.01)

(58) Field of Classification Search
CPC .... C08G 65/00; C09K 2208/12; C09K 8/032; C09K 8/035; C09K 8/08; C09K 8/10; C09K 8/12
See application file for complete search history.

(56) References Cited

U.S. PATENT DOCUMENTS 6,033,884 A * 3/2000 Woo .......................... C07K 7/02
                                                                                      435/7.1
6,627,612 B1 * 9/2003 O'Lenick, Jr. ......... C07H 15/04
                                                                                       536/18.6
(Continued)

FOREIGN PATENT DOCUMENTS

CN    106432375 A    2/2017
CN    106432377 A    2/2017
(Continued)

OTHER PUBLICATIONS

English translation of CN 106432377A translated Aug. 15, 2022, 11 pages.*

*Primary Examiner* — Alicia Bland
(74) *Attorney, Agent, or Firm* — NKL Law; Allen Xue

(57) ABSTRACT

The present invention relates to substituted saccharides or glycosides and their use in drilling fluid compositions. The substituted saccharide or glycoside bears a substituent A, a
(Continued)

substituent B and a substituent C, wherein the substituent A comprises in its structure a group

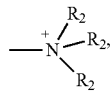

the substituent B comprises in its structure a group

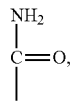

and the substituent C comprises in its structure a unit —NH—$R_7$—. The definition of each group is described in the description. The drilling fluid composition can show good temperature resistance, filtration loss reducing reduction property, pollution resistance, inhibition property, lubricating property or reservoir protection property, and has no biotoxicity.

22 Claims, 4 Drawing Sheets

(51) Int. Cl.
*C09K 8/035* (2006.01)
*C09K 8/10* (2006.01)

(56) References Cited

U.S. PATENT DOCUMENTS

| | | | | |
|---|---|---|---|---|
| 2011/0177004 | A1* | 7/2011 | Moore | A61K 51/048 |
| | | | | 250/363.04 |
| 2012/0165282 | A1* | 6/2012 | Dozzo | C07H 15/236 |
| | | | | 536/13.6 |
| 2015/0126417 | A1* | 5/2015 | Hatchman | C09K 8/58 |
| | | | | 507/219 |
| 2016/0303184 | A1* | 10/2016 | Haldar | A61P 31/04 |
| 2019/0223434 | A1* | 7/2019 | Balasubramanian | A01N 43/16 |
| 2022/0185925 | A1* | 6/2022 | Anderson | C08F 2/28 |

FOREIGN PATENT DOCUMENTS

| | | |
|---|---|---|
| CN | 106467562 A | 3/2017 |
| CN | 107973827 A | 5/2018 |
| CN | 107987808 A | 5/2018 |
| WO | WO-2014139027 A1 * | 9/2014 ............ C09K 8/035 |

* cited by examiner

SUBSTITUTED SACCHARIDES OR GLYCOSIDES AND USE THEREOF IN A DRILLING FLUID COMPOSITION

TECHNICAL FIELD

The present invention relates to substituted saccharides or glycosides, and more particularly to a substituted saccharide or glycoside or a mixture of a plurality of substituted saccharides or glycosides. The invention also relates to a drilling fluid composition produced from the substituted saccharides or glycosides and a process of producing the drilling fluid composition.

BACKGROUND OF THE INVENTION

During the process of oil and gas drilling, when drilling highly water-sensitive shale with high clay mineral content and strata easily to collapse such as mudstone, the conventional water-based drilling fluid cannot effectively inhibit the hydration expansion and dispersion of the highly water-sensitive strata. Although the strongly-inhibiting water-based drilling fluid has a good anti-collapse effect, is low in cost and is environment-friendly, the property of the strongly-inhibiting water-based drilling fluid is not comparable to that of the oil-based drilling fluid. Therefore, the conventional solution is still to use oil-based drilling fluids when drilling strata easily to collapse such as highly active shale. However, the oil-based drilling fluid has a plurality of defects, specifically, the problems of high preparation cost, inconvenience in logging operation, serious loss during lost circulation, high pressure for drilling cuttings post-treatment and the like, which defects limit the larger-scale application of the oil-based drilling fluid.

SUMMARY OF THE INVENTION

The present inventors deem that in the current situation, a drilling fluid composition system that is completely non-hydratable to the stratum is more and more interested in the field. The drilling fluid composition achieves the effect of completely avoiding hydration to stratum by mainly blocking water with forming a film through adsorption, driving water through reverse osmosis, reducing the water activity of the drilling fluid, embedding and tensioning a crystal layer and the like. The drilling fluid composition has an action mechanism similar to that of oil-based drilling fluid and has property comparable to that of the oil-based drilling fluid. In addition, the drilling fluid composition system also has environmental protection advantages absent by the oil-based drilling fluid. The drilling fluid composition can achieve t effects comparable to the oil-based drilling fluid when being used for drilling high-activity mudstone, strata easily to collapse such as mudstone and shale oil-gas horizontal wells. The drilling fluid composition has important significance for dealing with the complex conditions of instability of the well wall of strata easily to collapse and the like, relieving the environmental protection pressure brought by the oil-based drilling fluid, and expanding the application range of the water-based drilling fluid and the like.

Based on the comments above, the inventors of the present invention studied and found a substituted saccharide or glycoside or a mixture of a plurality of substituted saccharides or glycosides, and further found that if the substituted saccharide or glycoside or the mixture of a plurality of substituted saccharides or glycosides is used as a component to produce a drilling fluid composition, the drilling fluid composition can exhibit superior temperature resistance, property of reducing filtration loss, contamination resistance, inhibition property, lubrication property, and reservoir protection property, and is not biologically toxic. The present invention has been completed based thereon.

Specifically, the present invention relates to the following aspects.

1. A substituted saccharide or glycoside or a mixture of a plurality of substituted saccharides or glycosides, each or in combination, having a substituent A, a substituent B and a substituent C, wherein the substituent A contains in its structure a group

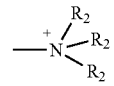

(the counter anion of which may be any anion, in particular a halogen anion such as Cl⁻ or Br⁻), wherein $R_2$ is C1-20 linear or branched alkyl (preferably C1-10 linear or branched alkyl, more preferably C1-4 linear or branched alkyl), the substituent B contains in its structure a group

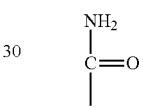

(preferably containing units

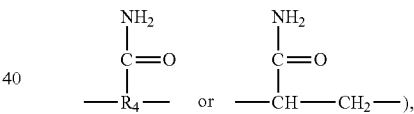

wherein $R_4$ is a C2-6 linear or branched alkylene group (preferably ethylene or propylene), and the substituent C contains in its structure units —NH—$R_7$— (preferably —NH—CH₂CH₂—) wherein $R_7$ is C2-6 linear or branched alkylene (preferably ethylene or propylene).

2. The substituted saccharide or glycoside or the mixture of a plurality of substituted saccharides or glycosides according to any one of the preceding or subsequent aspects, wherein the substituent A further contains in its structure unit —O—$R_6$— (preferably —O—CH₂CH₂—

—O—CH(CH₃)CH₂— or any combination thereof) and/or unit

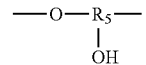

(preferably

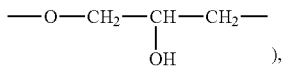
), wherein $R_5$ is C3-6 linear or branched trivalent alkyl (preferably trivalent propyl or trivalent butyl), $R_6$ is C2-8 linear or branched alkylene (preferably ethylene or propylene), and/or the substituent B further contains in its structure unit

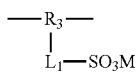

(preferably

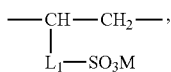

particularly

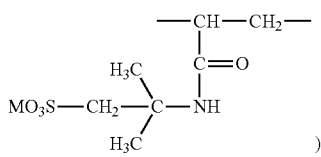
)

and/or unit

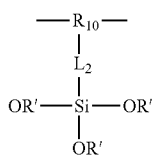

(preferably

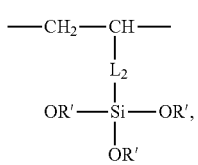

particularly

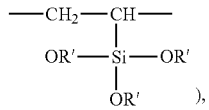
), wherein $R_3$ is C2-6 linear or branched alkylene (preferably ethylene or propylene), $L_1$ is any linking group preferably having no more than 10 carbon atoms (preferably a single bond, C2-10 linear or branched alkylene, —C(=O)—C2-10 linear or branched alkylene, —C(=O)O—C2-10 linear or branched alkylene, —C(=O)NH—C2-10 linear or branched alkylene, C2-5 linear or branched alkylene-C(=O)—C2-5 linear or branched alkylene, C2-5 linear or branched alkylene-C(=O)O—C2-5 linear or branched alkylene, C2-5 linear or branched alkylene-C(=O)NH—C2-5 linear or branched alkylene, more preferably —C(=O) NH—C2-10 linear or branched alkylene), M is hydrogen, an alkali metal (such as K or Na), or ammonium ($NH_4$), $R_{10}$ is C2-6 linear or branched alkylene (preferably ethylene or propylene), $L_2$ is any linking group preferably having no more than 10 carbon atoms (preferably single bond or C2-10 linear or branched alkylene, especially single bond), R' is C1-4 linear or branched alkyl (preferably methyl or ethyl), and/or the substituent C further contains in its structure a unit —O—$R_6$— (preferably —O—$CH_2CH_2$—,

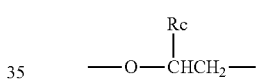

or any combination thereof) and/or a unit

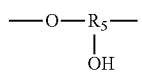

(preferably

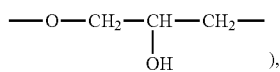
), $R_5$ is C3-6 linear or branched trivalent alkyl (preferably trivalent propyl or trivalent butyl), $R_6$ is C2-8 linear or branched alkylene or C2-6 linear or branched alkylene, and Rc is C1-5 linear or branched alkyl or C1-4 linear or branched alkyl.

3. The substituted saccharide or glycoside or the mixture of a plurality of substituted saccharides or glycosides according to any one of the preceding or subsequent aspects, wherein the substituent A is represented schematically by the following formula (A-1) or formula (A-2),

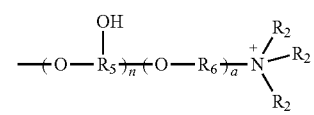
(A-1)

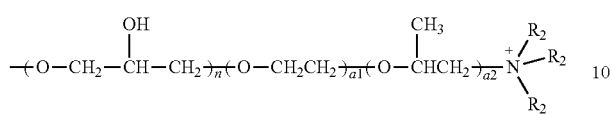
(A-2)

wherein n is a number ranging from 0 to 3 (e.g., 1), a is a number ranging from 0 to 6 (e.g., a number ranging from 1 to 4), a1 is a number ranging from 0 to 3 (e.g., a number ranging from 1 to 2), and a2 is a number ranging from 0 to 3 (e.g., a number ranging from 1 to 2),

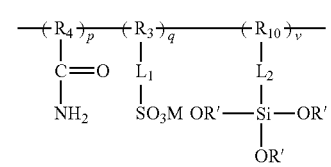
(B-1)

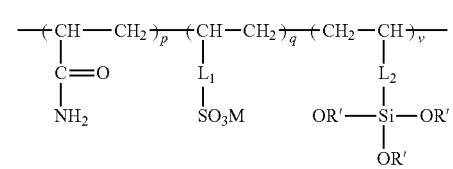
(B-2)

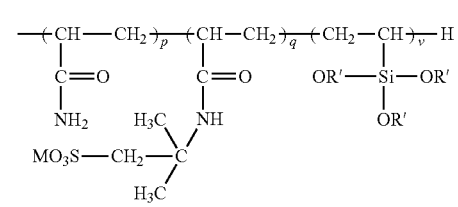
(B-3)

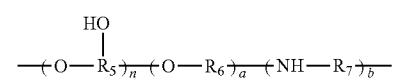
(C-1)

The substituent B is represented schematically by the following formula (B-1), formula (B-2) or formula (B-3),

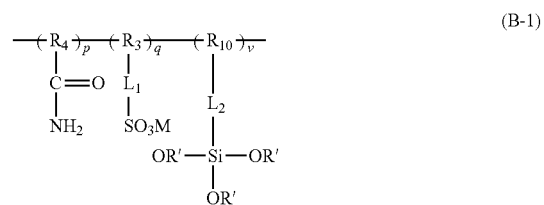
(B-1)

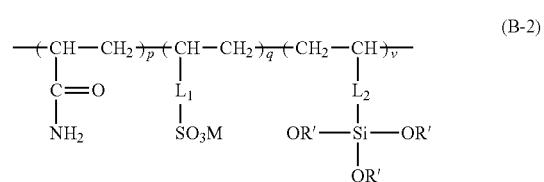
(B-2)

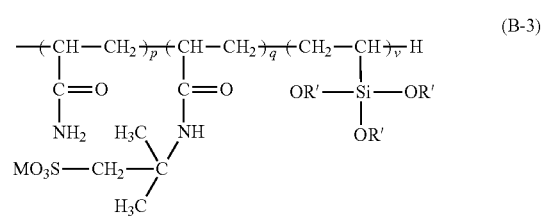
(B-3)

wherein p is a number ranging from 2 to 30 (preferably a number ranging from 2 to 20 or from 4 to 16), q is a number ranging from 0 to 30 (preferably a number ranging from 2 to 30, from 2 to 15 or from 4 to 12), and v is a number ranging from 0 to 30 (preferably a number ranging from 1 to 20 or from 4 to 12), the substituent C is represented schematically by the following formula (C-1), formula (C-2) or formula (C-3),

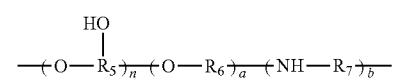
(C-1)

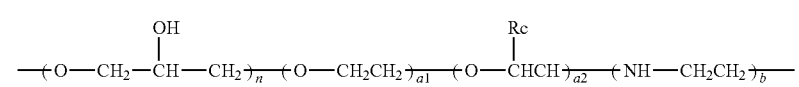
(C-2)

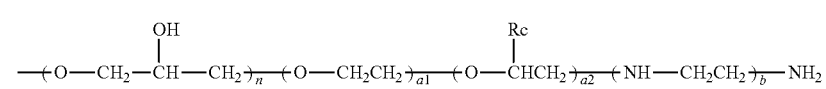
(C-3)

wherein n is a number ranging from 0 to 3 (e.g., 0), a is a number ranging from 0 to 6 (e.g., a number ranging from 1 to 4), a1 is a number ranging from 0 to 3 (e.g., a number ranging from 1 to 2), a2 is a number ranging from 0 to 3 (e.g., a number ranging from 1 to 2), and b is a number ranging from 1 to 5 (e.g., a number ranging from 2 to 4), wherein a and b-1 are not 0 at the same time or a1, a2, and b-1 are not 0 at the same time.

4. The substituted saccharide or glycoside or the mixture of a plurality of substituted saccharides or glycosides according to any one of the preceding or subsequent aspects, wherein the saccharide or glycoside is a glucose residue or a glucoside residue represented schematically by the following formula (1),

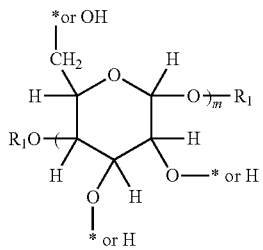

(1)

wherein two $R_1$, equal to or different from one another, are each independently selected from the group consisting of hydrogen and C1-20 linear or branched alkyl (preferably each independently selected from the group consisting of hydrogen and C1-10 linear or branched alkyl, more preferably each independently selected from the group consisting of hydrogen and C1-4 linear or branched alkyl), m is an integer of 1-3 or 1-2, and * represents the bonding point of said substituent A, said substituent B or said substituent C, provided that there is at least one of said bonding points.

5. The substituted saccharide or glycoside or the mixture of substituted saccharides or glycosides according to any one of the preceding or subsequent aspects, being selected from one or more compounds represented schematically by the following formula (XX),

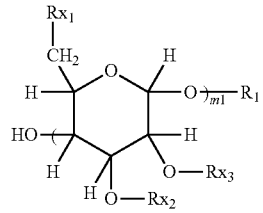

(XX)

in the formula (XX), among m1 number of $Rx_1$, one $Rx_1$ is said substituent A, another $Rx_1$ is said substituent C, while the remaining $Rx_1$, same or different from each other, are each independently selected from said substituent A, said substituent C and a hydroxyl group, wherein m1 is an integer of 2 to 3; and m1 number of $Rx_2$ and m1 number of $Rx_3$, same or different from each other, are each independently selected from a hydrogen atom and said substituent B, provided that at least one of these Rx 2 and Rx 3 is said substituent B, when one or more compounds selected from the group consisting of compounds schematically represented by the following formula (I-1), formula (I-2) or formula (I-3) are called as compound P, one or more compounds selected from the group consisting of compounds schematically represented by the following formula (II-1) or formula (II-2) are called as compound X, one or more compounds selected from the group consisting of compounds schematically represented by the following formula (III-1), formula (III-2) or formula (III-3) are called as compound Y, and one or more compounds selected from the group consisting of compounds schematically represented by the following formula (IV-1), formula (IV-2) or formula (IV-3) are called as compound Z, the mixture is a mixture of at least two (preferably at least three) compounds selected from the group consisting of the compound P, the compound X, the compound Y and the compound Z, provided that the mixture contains concurrently the substituent A, the substituent B and the substituent C,

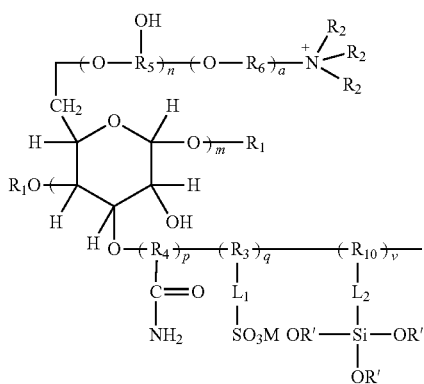

(I-1)

-continued
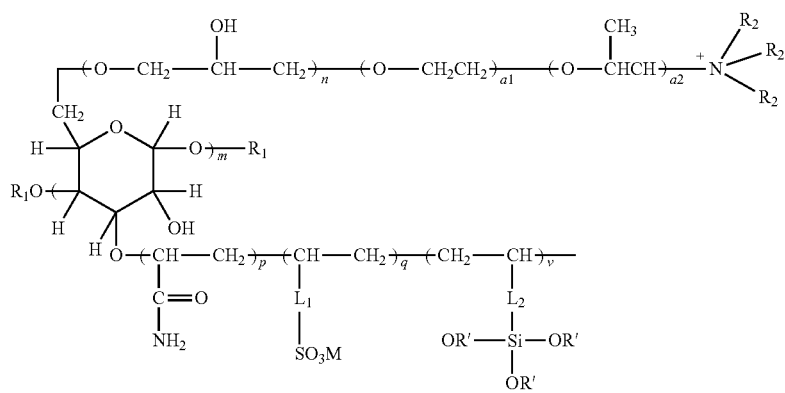
(I-2)
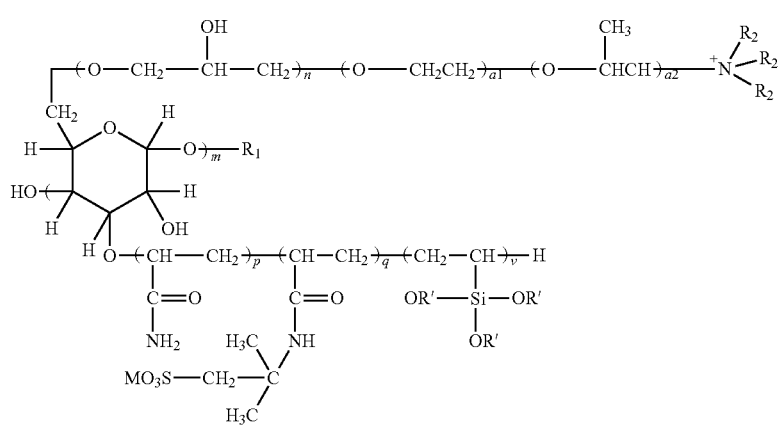
(I-3)
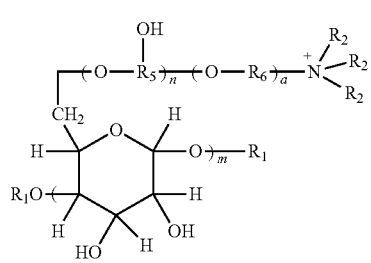
(II-1)
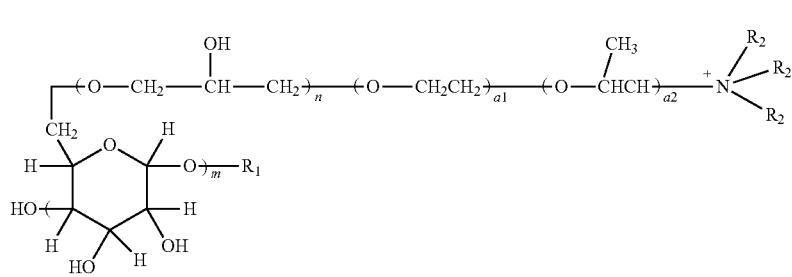
(preferably, a1 = 0, a2 = 0, and n = 1)
(II-2)
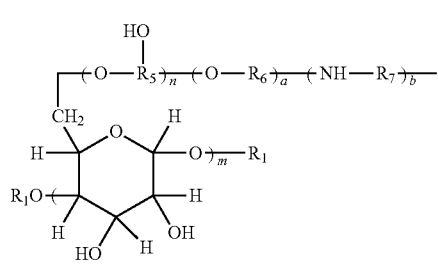
(III-1)

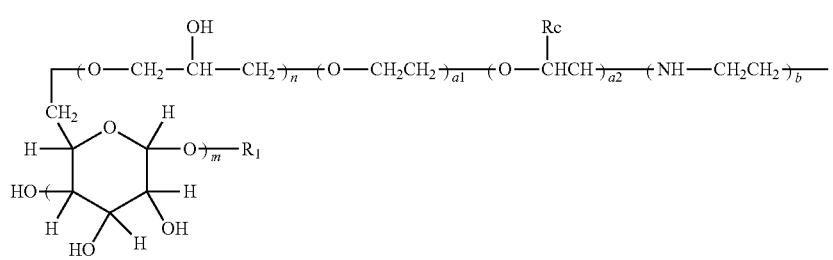
(III-2)
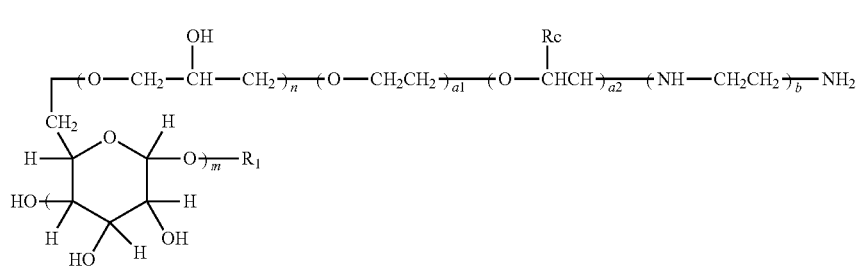
(III-3)
(preferably, n is 0, R is methyl, a1 is a number ranging from 0 to 3 (e.g., a number ranging from 1 to 2), a2 is a number ranging from 0 to 3 (e.g., a number ranging from 1 to 2), b is a number ranging from 1 to 4 (e.g., a number ranging from 2 to 3), and m is 1)
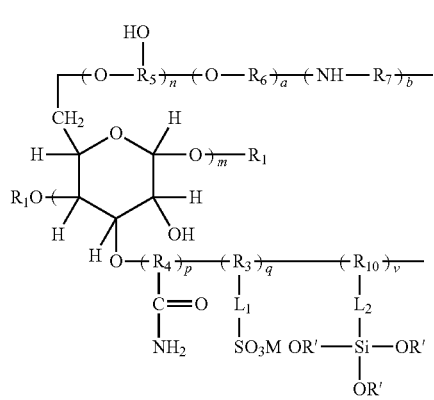
(IV-1)
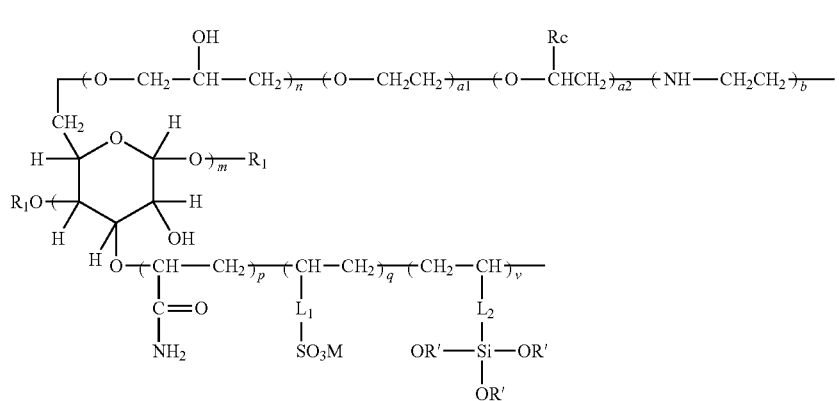
(IV-2)

-continued

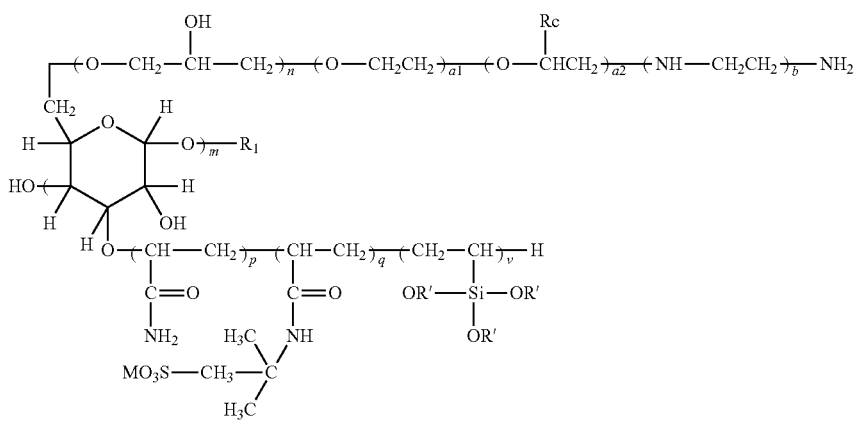
(IV-3)

(preferably, n is 0, a1 is 0, a2 is a number ranging from 1 to 3 (e.g., a number ranging from 1 to 2), b is a number ranging from 1 to 5 (e.g., a number ranging from 2 to 4), and v=0).

6. The substituted saccharide or glycoside or the mixture of a plurality of substituted saccharides or glycosides according to any one of the preceding or subsequent aspects, which is a mixture of said compound X (preferably, a1=0, a2=0, and n=1), said compound Y (preferably, n is 0, Rc is methyl, a1 is a number ranging from 0 to 3 (such as a number ranging from 1 to 2), a2 is a number ranging from 0 to 3 (such as a number ranging from 1 to 2), b is a number ranging from 1 to 4 (such as a number ranging from 2 to 3), and m is 1) and said compound Z (preferably, n is 0, a1 is 0, a2 is a number ranging from 1 to 3 (such as a number ranging from 1 to 2), b is a number ranging from 1 to 5 (such as a number ranging from 2 to 4), and v=0), wherein the weight ratio of said compound X, said compound Y and said compound Z is 20-30:30-40:10-25.

7. The substituted saccharide or glycoside or the mixture of substituted saccharides or glycosides according to any one of the preceding or subsequent aspects, having a cationicity of from 0.10 to 0.80 mmol/g, preferably from 0.25 to 0.50 mmol/g, and/or an amine value of from 0.40 to 1.65 mmol/g, preferably from 0.83 to 1.32 mmol/g.

8. A drilling fluid composition comprising a drilling fluid base fluid and optionally at least one treating agent, wherein the drilling fluid base fluid consists of one substituted saccharide or glycoside or a mixture of a plurality of substituted saccharides or glycosides as described in any one of the preceding or subsequent aspects (collectively called as a substituted saccharide or glycoside) and water.

9. The drilling fluid composition of any one of the preceding or subsequent aspects, wherein the substituted saccharide or glycoside is present in an amount of 60 to 95 wt %, based on 100 wt % of the drilling fluid base fluid, and/or the at least one treating agent is present in an amount of 10 to 70 g, preferably 18.3 to 41.7 g, based on 100 mL of the drilling fluid base fluid, and/or the at least one treating agent is selected from at least one of a tackifier, a flow form modifier, a filtration loss reducer, a high temperature stabilizer, a plugging agent, an inhibition enhancer, and a pH adjuster.

10. A process for producing a drilling fluid composition, comprising the steps of mixing a substituted saccharide or glucoside or a mixture of a plurality of substituted saccharides or glycosides (collectively called as substituted saccharide or glucoside) according to any one of the preceding or subsequent aspects, water and optionally at least one treating agent (preferably, mixing the substituted saccharide or glucoside with water, and then mixing the mixture obtained with optionally the at least one treating agent), and then optionally carrying out aging treatment on the mixture obtained (preferably, the treatment temperature is 120-200° C. or 140-180° C., preferably 155-165° C., and the treatment duration is 10-30 hours or 15-20 hours, and preferably 15-17 hours).

Technical Effects

According to the invention, at least one of the following technical effects can be achieved:

(1) The drilling fluid composition of the present invention has good temperature resistance.

(2) The drilling fluid composition of the present invention has good filtration loss reducing property.

(3) The drilling fluid composition of the present invention has good contamination resistance.

(4) The drilling fluid composition of the present invention has good inhibiting property.

(5) The drilling fluid composition of the present invention has good lubricating property.

(6) The drilling fluid composition of the present invention has good reservoir protection property.

(7) The drilling fluid composition of the present invention is suitable for mud shale with high water sensitivity, strata easily to collapse such as mudstone, drilling of shale gas horizontal well and stratum with high reservoir protection requirements.

(8) The drilling fluid composition of the present invention has no biotoxicity, has good environmental protection property, can be directly discharged, can reduce the cost for treating the drilling fluid, and can reduce the cost of the drilling fluid, thus is suitable for stratum and ocean drilling with high environmental protection requirements.

(9) The production process provided by the invention is easy to be operated under mild conditions, is safe and environment-friendly, and suitable for large-scale production and application, for which all the raw materials are free of biotoxicity.

EMBODIMENTS OF THE INVENTION

Figure 1:
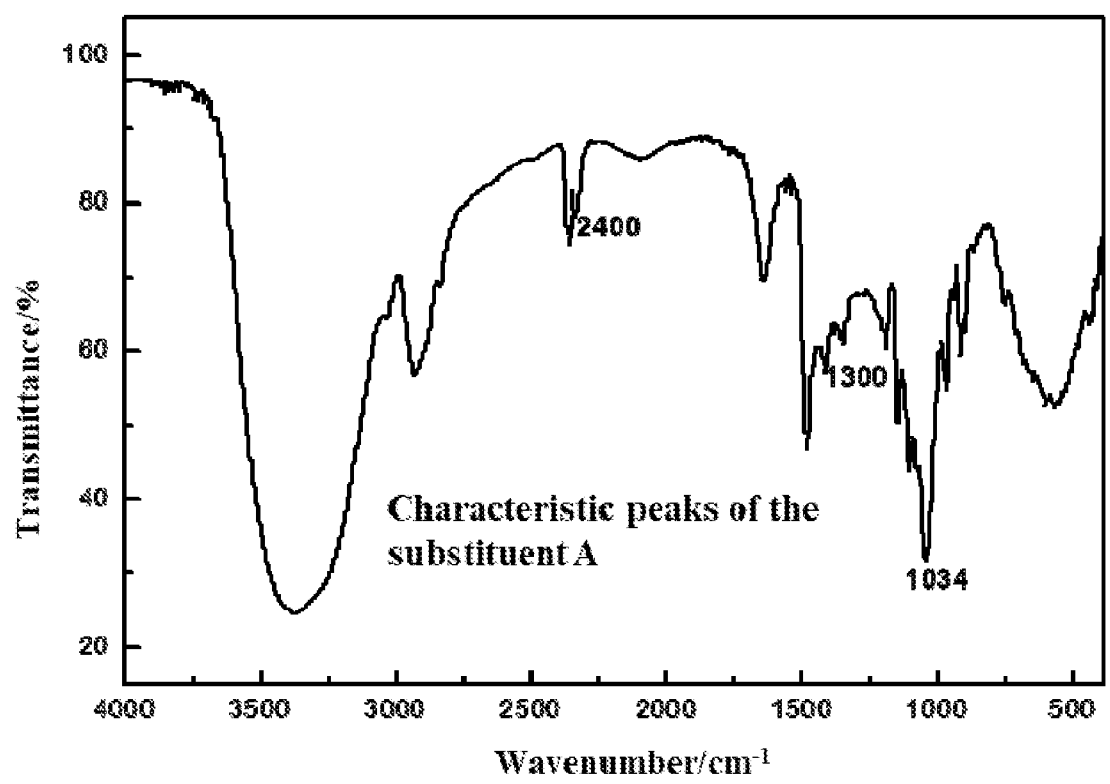
FIG. 1 is an infrared spectrum of the substituted glycoside component obtained in example 1 of the present invention.
Figure 2:
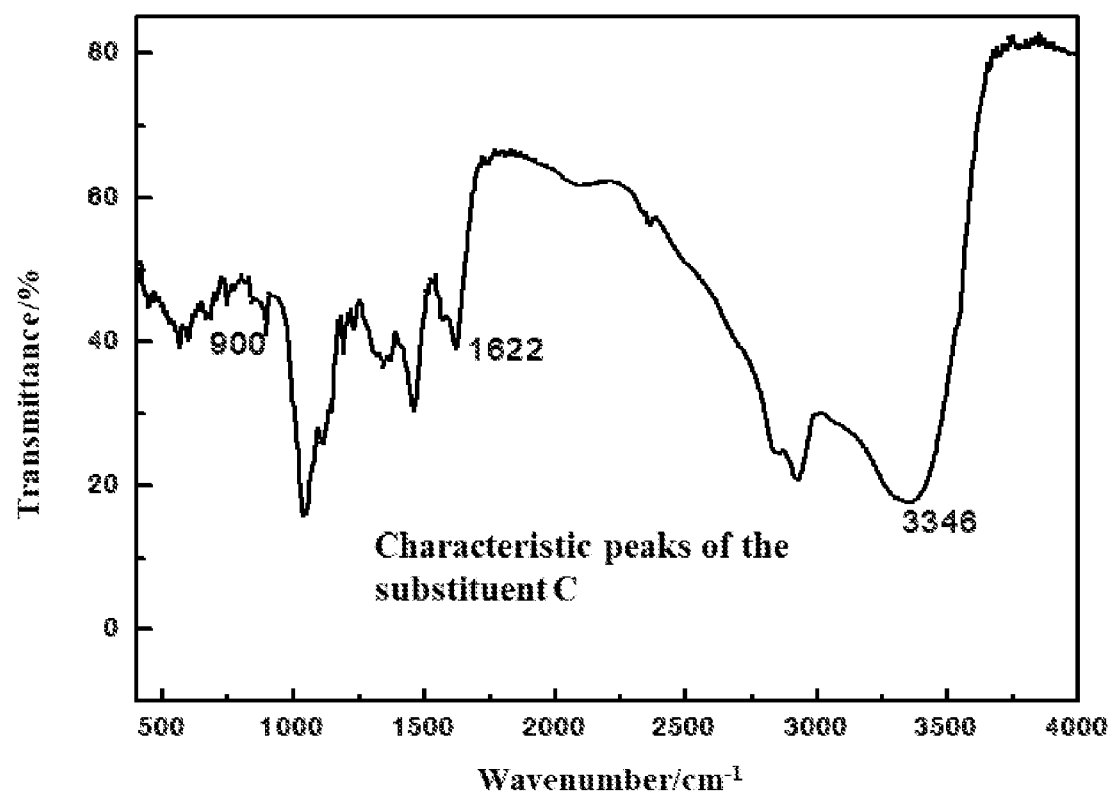
FIG. 2 is an infrared spectrum of the substituted glycoside component obtained in example 5 of the present invention.

The embodiments of the present invention will be illustrated in more detail below, but it should be understood that the scope of the invention is not limited by the embodiments, but is defined by the claims appended.

All publications, patent applications, patents, and other references mentioned in this specification are herein incorporated by reference in their entirety. Unless defined otherwise, all technical and scientific terms used herein are understood same as the meanings commonly known to those skilled in the art. In case of conflict, definitions according to the present specification will control.

When the specification introduces materials, substances, processes, steps, devices, components, or the like initiated with "known to those ordinary skill in the art", "prior art", or the like, it is intended that the subject matter so initiated encompass not only those conventionally used in the art at the time of filing this application, but also those may not be so commonly used at the present time, but will become known in the art as being suitable for a similar purpose.

In the context of the present specification, the numerical values include integers and fractions.

In the context of the present specification, the measurement of the cationicity comprises: the sample to be tested is first diluted to a 1.0% aqueous solution. 50 mL of the 1.0% sample solution to be tested is placed in a dry and clean 100 mL volumetric flask, and 25 mL of sodium tetraphenylborate (STPB) solution is accurately added in by a pipette. The mixed solution is transferred into a 100 mL volumetric flask, the pH value is adjusted to 3-5 by hydrochloric acid solution, and then the volume is increased to 100 mL by distilled water, and stood for 30 min. Filtration is made with a dry and clean funnel and a double-layer filter paper, which filtration may be repeated for several times, until the filtrate is clear. 25 mL of the clear filtrate is accurately transferred with a pipette into a conical flask, the pH value is adjusted to 7-8 with a sodium hydroxide solution, 6-10 drops of bromophenol blue indicator is added, and titration is made using (hexadecyl trimethyl ammonium bromide) QAS solution, during which the titration end point is arrived when the solution color is changed from violet blue to light blue. If the color of the solution before titration is light blue, it means that the dosage of the STPB solution is insufficient, and the steps above are required to be repeated again. The cationicity measurement is made for randomly sampled 5 batches of the samples to be tested. Then, the cationicity is calculated according to formula (1).

$$A = \frac{V_5 c_3 - 4 V_6 c_2}{0.63 \times (1 - W_2)} \quad (1)$$

in the formula:

A—cationicity in millimoles per gram (mmol/g);

$V_5$—volume of STPB solution used when the total volume is measured, in milliliters (mL);

$V_6$—volume of QAS solution used when the total volume is measured, in milliliters (mL);

$c_3$—concentration of STPB solution, in moles per liter (mol/L);

$c_2$—concentration of QAS solution, in moles per liter (mol/L);

$W_2$—solid content, %.

In the context of the present description, the measurement of amine value comprises: 0.5 g of the sample to be tested (with accuracy to 0.0001 g) is weighed into a clean and dry 250 mL conical flask, 50 mL of deionized water is added and the total weight $m_1$ is recorded. 5 drops of bromocresol green-methyl red indicator are added into the solution to be detected, shaken uniformly, and titration is made at a constant speed using a standard solution of hydrochloric acid dropwise. The color change of the solution is observed carefully while shaking uniformly. When the color of the solution is changed from green to dark red, it is determined to be the titration end point. The volume V of the hydrochloric acid standard solution consumed is recorded. A blank test is carried out simultaneously. Amine value measurement is made for randomly sampled 3 batches of the test samples. The amine value is calculated according to formula (2):

$$\text{Amine value} = \frac{C_{HCl} \times (V - V_{blank})}{m} \quad (2)$$

in the formula:

Total amine value—calculated as H⁺, in the unit of millimoles per gram (mmol/g);

$C_{HCl}$—concentration of hydrochloric acid standard solution used, in moles per liter (mol/L);

V—value of the volume of the hydrochloric acid-isopropanol standard solution consumed by the sample to be detected, in milliliter (mL);

$B_{lank}$—value of the blank hydrochloric acid solution, in milliliters (mL);

m—accurate value of the weight of the sample to be measured, in gram (g).

All percentages, parts, ratios, etc. involved in this description are provided by weight, while pressures are gauge pressures, unless explicitly indicated.

In the context of this description, any two or more embodiments of the invention may be combined in any manner, and the resulting solution is a part of the original disclosure of this description, and is within the scope of the invention.

According to an embodiment of the present invention, it relates to one/a substituted saccharide or glycoside or a mixture of a plurality of substituted saccharides or glycosides. The term "one/a substituted saccharide or glycoside" as used herein refers to a substituted saccharide or glycoside present as a single compound, and the term "a mixture of a plurality of substituted saccharides or glycosides" refers to a mixture of two or more (i.e., a plurality of) substituted saccharides or glycosides. For the present invention, whether the substituted saccharide or glycoside of the present invention is present in the form of respective compound independently or in the form of a mixture with each other, the intended purpose of the present invention can be achieved without any particular limitation. Thus, the present invention sometimes refers collectively to the one substituted saccharide or glycoside and the plurality of substituted saccharides or glycosides collectively as substituted saccharide or glycoside.

According to an embodiment of the present invention, the substituted saccharide or glycoside bears, either individually or in combination, a substituent A, a substituent B and a substituent C. Here, the so-called "bear individually" or the like means that the substituent A, the substituent B and the substituent C are each located on different substituted saccharide or glycoside molecules, while the so-called "bear in combination" or the like means that the substituent A, the substituent B and the substituent C may be either located on different substituted saccharide or glycoside molecules, respectively, or located on different or the same substituted saccharide or glycoside molecules in any combination (for example, two-by-two combination or a combination of all the three).

According to an embodiment of the present invention, the substituent A comprises in its structure a group

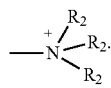

Here, the counter anion of the group may be any anion, in particular a halogen anion such as $Cl^-$ or $Br^-$. In addition, $R_2$ is a C1-20 linear or branched alkyl, preferably a C1-10 linear or branched alkyl, more preferably a C1-4 linear or branched alkyl. Here, the presence of the group

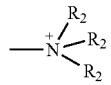

or the substituent A can be determined by an infrared analysis method. For example, the presence of the group

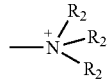

or the substituent A can be determined by an IR spectrum of the substituted saccharide or glycoside (including the substituted glycoside component described herein below) showing characteristic peaks at $1034\pm10$ cm$^{-1}$, $1300\pm10$ cm$^{-1}$ and $2400\pm10$ cm$^{-1}$.

According to an embodiment of the present invention, the substituent B comprises in its structure a group

Preferably, the substituent B comprises in its structure unit

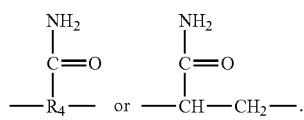

Here, $R_4$ is a C2-6 linear or branched alkylene group, preferably an ethylene group or a propylene group. Here, the presence of the group

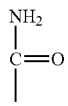

or the substituent B can be determined by an infrared analysis method. For example, the presence of the group

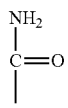

or the substituent B can be determined by an IR spectrum of the substituted saccharide or glycoside (including the substituted glycoside component described herein below) showing characteristic peaks at $1501\pm10$ cm$^{-1}$, $1650\pm10$ cm$^{-1}$ and $3386\pm10$ cm$^{-1}$.

According to an embodiment of the present invention, said substituent C comprises in its structure a unit —NH—$R_7$—. Preferably, the substituent C comprises in its structure a unit —NH—CH$_2$CH$_2$— Here, $R_7$ is a C2-6 linear or branched alkylene group, preferably an ethylene group or a propylene group. Here, the presence of the unit —NH—$R_7$— or the substituent C can be determined by an infrared analysis method. For example, the presence of the unit —NH—$R_7$— or the substituent C can be determined by an IR spectrum of the substituted saccharide or glycoside (including the substituted glycoside component described herein below) showing characteristic peaks at $900\pm10$ cm$^{-1}$, $1622\pm10$ cm$^{-1}$ and $3346\pm10$ cm$^{-1}$.

According to an embodiment of the present invention, the substituent A may also comprise in its structure a unit —O—$R_6$—, preferably —O—CH$_2$CH$_2$—,

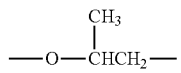

or any combination thereof. Here, $R_6$ is a C2-8 linear or branched alkylene group, preferably an ethylene or propylene group.

According to an embodiment of the present invention, the substituent A may also comprise in its structure a unit

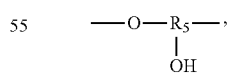

preferably

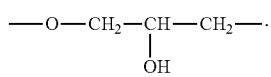

Here, $R_5$ is a C3-6 linear or branched trivalent alkyl group, preferably trivalent propyl or trivalent butyl.

According to an embodiment of the present invention, the substituent B may also comprise in its structure a unit

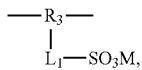

preferably

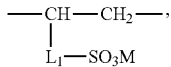

in particular

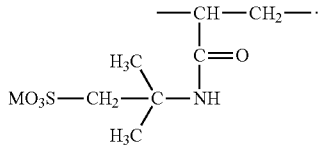

Here, $R_3$ is a C2-6 linear or branched alkylene group, preferably an ethylene group or a propylene group. Further, $L_1$ is any linking group, preferably any linking group having no more than 10 carbon atoms, more preferably a single bond, C2-10 linear or branched alkylene, —C(═O)—C2-10 linear or branched alkylene, —C(═O)O—C2-10 linear or branched alkylene, —C(═O)NH—C2-10 linear or branched alkylene, C2-5 linear or branched alkylene-C(═O)—C2-5 linear or branched alkylene, C2-5 linear or branched alkylene-C(═O)O—C2-5 linear or branched alkylene, C2-5 linear or branched alkylene-C(═O)NH—C2-5 linear or branched alkylene, more preferably-C(═O)NH—C2-10 linear or branched alkylene. M is hydrogen, an alkali metal (such as K or Na) or ammonium ($NH_4$).

According to an embodiment of the present invention, the substituent B may also comprise in its structure a unit

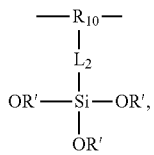

preferably

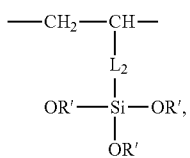

in particular

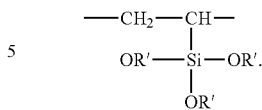

Here, $R_{10}$ is a C2-6 linear or branched alkylene group, preferably an ethylene group or a propylene group. $L_2$ is any linking group, preferably any linking group having no more than 10 carbon atoms, more preferably a single bond or a C2-10 linear or branched alkylene group, especially a single bond. R' is a C1-4 linear or branched alkyl group, preferably methyl or ethyl.

According to an embodiment of the present invention, said substituent C may also comprise in its structure a unit —O—$R_6$—, preferably —O—$CH_2CH_2$—,

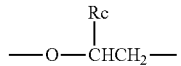

or any combination thereof. Here, $R_6$ is a C2-8 linear or branched alkylene group or a C2-6 linear or branched alkylene group. Further, Rc is a C1-5 linear or branched alkyl group or a C1-4 linear or branched alkyl group.

According to an embodiment of the present invention, the substituent C may also comprise in its structure a unit

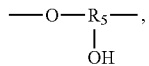

preferably

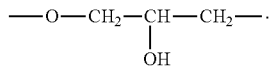

Here, $R_5$ is a C3-6 linear or branched trivalent alkyl group, preferably trivalent propyl or trivalent butyl.

According to an embodiment of the present invention, the substituent A may be represented schematically by the following formula (A-1) or formula (A-2). In the context of the present description, the expression "represent(ed) schematically" means, taking the formula (a-1) as an example, that the substituent A, although comprising "n" number of units

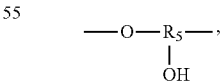

"a" number of units —O—$R^6$—and one group

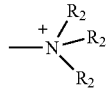

in one molecule as shown in the formula (a-1), does not limit that the "n" number of units

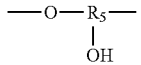

must be directly bonded to each other as shown in the formula to form a block structure, or that the "a" number of units —O—$R_6$— must be directly bonded to each other as shown in the formula to form a block structure, nor limit that the unit —O—$R_6$— and the unit

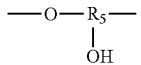

must be bonded in the specific order shown in the formula. Actually, according to the spirit of the present invention, the unit —O—$R_6$— and the unit

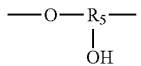

may be bonded in any order to form a random, block or alternating structure, and these structures are not particularly limited and fall within the intended scope of the present invention. Other formulas in the description can be similarly understood.

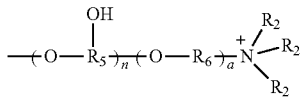 (A-1)

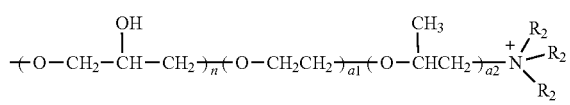 (A-2)

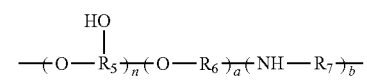 (C-1)

 (C-2)

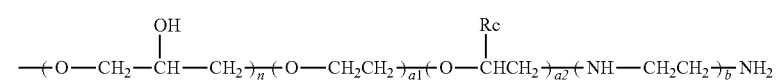 (C-3)

According to an embodiment of the present invention, in the formulas, n is a number ranging from 0 to 3 (e.g. 1), a is a number ranging from 0 to 6 (e.g. 1 to 4), a1 is a number ranging from 0 to 3 (e.g. 1 to 2) and a2 is a number ranging from 0 to 3 (e.g. 1 to 2). In these formulas, all substituents and numbers which are not explicitly defined (e.g. $R_5$, $R_6$, $R_2$, etc.) apply directly to the corresponding definitions in substituent A.

According to an embodiment of the present invention, the substituent B may be represented schematically by the following formula (B-1), formula (B-2), or formula (B-3).

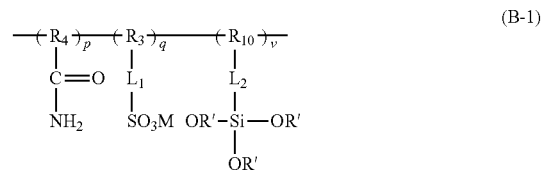 (B-1)

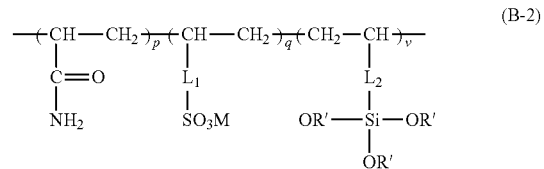 (B-2)

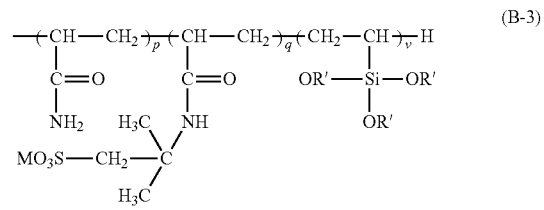 (B-3)

According to an embodiment of the present invention, in these formulas, p is a number ranging from 2 to 30 (preferably a number ranging from 2 to 20 or from 4 to 16), q is a number ranging from 0 to 30 (preferably a number ranging from 2 to 30, from 2 to 15 or from 4 to 12) and v is a number ranging from 0 to 30 (preferably a number ranging from 1 to 20 or from 4 to 12). In these formulas, all substituents and numbers which are not explicitly defined (e.g. R3, R4, R10, L1, L2, R' and M, etc.) apply directly to the corresponding definitions in substituent B.

According to an embodiment of the present invention, the substituent C may be schematically represented by the following formula (C-1), formula (C-2), or formula (C-3).

According to an embodiment of the present invention, in the formulas, n is a number ranging from 0 to 3 (e.g., 0), a is a number ranging from 0 to 6 (e.g., a number ranging from 1 to 4), a1 is a number ranging from 0 to 3 (e.g., a number ranging from 1 to 2), a2 is a number ranging from 0 to 3 (e.g., a number ranging from 1 to 2), and b is a number ranging from 1 to 5 (e.g., a number ranging from 2 to 4), wherein a and b-1 are not 0 concurrently, or a1, a2, and b-1 are not 0 concurrently. In these formulas, all substituents and numbers which are not explicitly defined (e.g. R5, R6, Rc and R7 etc.) apply directly to the corresponding definitions in substituent C.

According to an embodiment of the present invention, the saccharide or glycoside is a glucose residue or a glucoside residue represented schematically by the following formula (1).

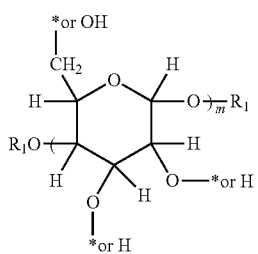

(1)

According to the present invention, the glucose residue or glucoside residue represented schematically by said formula (1) is a group obtained by removing the corresponding —OH or —H from a glucose or glucoside represented schematically by the following formula (1'). In the context of the present invention, said formula (1') may also be represented by formula (11') or formula (12'), but neither formula (1'), formula (11') nor formula (12') is intended to limit the steric configuration of any glucose or glucose glycoside according to the present invention or of any glucose residue or glucose glycoside residue according to the present invention.

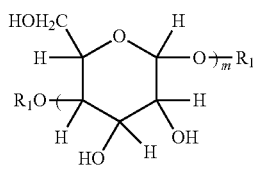

(1')

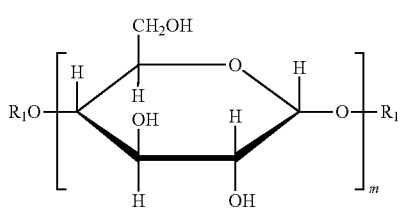

(11')

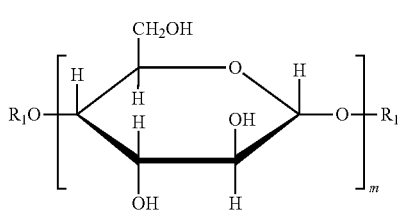

(12')

According to an embodiment of the present invention, in formula (1), two occurrences $R_1$ are the same or different from one another, and each is independently selected from hydrogen and a C1-20 linear or branched alkyl group, preferably each is independently selected from hydrogen and a C1-10 linear or branched alkyl group, more preferably each is independently selected from hydrogen and a C1-4 linear or branched alkyl group. m is an integer of 1 to 3 or 1 to 2. * represents a bonding site of said substituent A, said substituent B or said substituent C, provided that there is at least one of said bonding site. In other words, the glucose or glucose glycoside must be substituted with at least one of the substituents A, B and C.

According to an embodiment of the present invention, the substituted saccharide or glycoside is selected from one or more compounds represented schematically by the following formula (XX).

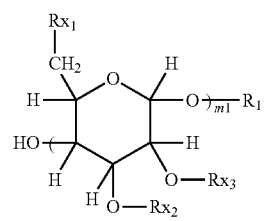

(XX)

According to an embodiment of the present invention, in the formula (XX), among the m1 number of $Rx_1$, one $Rx_1$ is the substituent A, another $Rx_1$ is the substituent C, and the remaining $Rx_1$ are same as or different from each other, each independently selected from the substituent A, the substituent C, and a hydroxyl group. m1 is an integer of 2 to 3. m1 number of $Rx_2$ and m1 number of $Rx_3$, same as or different from each other, are each independently selected from the group consisting of a hydrogen atom and said substituent B, provided that at least one of these $Rx_2$ and $Rx_3$ is said substituent B. In the formula (XX), all substituents and numbers (such as $R_1$, etc.) which are not explicitly defined apply directly to the corresponding definitions in the formula (1).

According to an embodiment of the present invention, when one or more compounds selected from the group consisting of compounds represented schematically by the following formula (I-1), formula (I-2) or formula (I-3) is called as compound P, one or more compounds selected from the group consisting of compounds represented schematically by the following formula (II-1) or formula (II-2) is called as compound X, one or more compounds selected from the group consisting of compounds represented schematically by the following formula (III-1), formula (III-2) or formula (III-3) is called as compound Y, and one or more compounds selected from the group consisting of compounds represented schematically by the following formula (IV-1), formula (IV-2) or formula (IV-3) is called as compound Z, the mixture is a mixture of at least two compounds selected from said compound P, said compound X, said compound Y, and said compound Z, provided that said mixture contains concurrently said substituent A, said substituent B and said substituent C. Here, the mixture is called as a "particular mixture", and the compound P, the compound X, the compound Y, or the compound Z is sometimes also called as a substituted glycoside component.

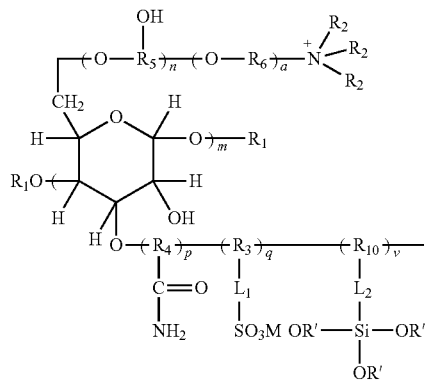
(I-1)
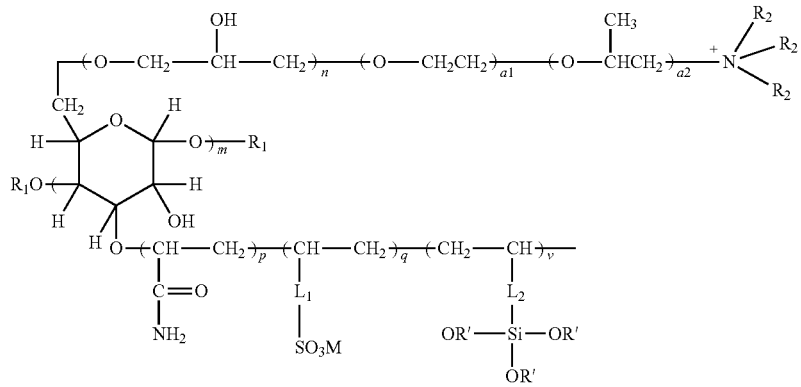
(I-2)
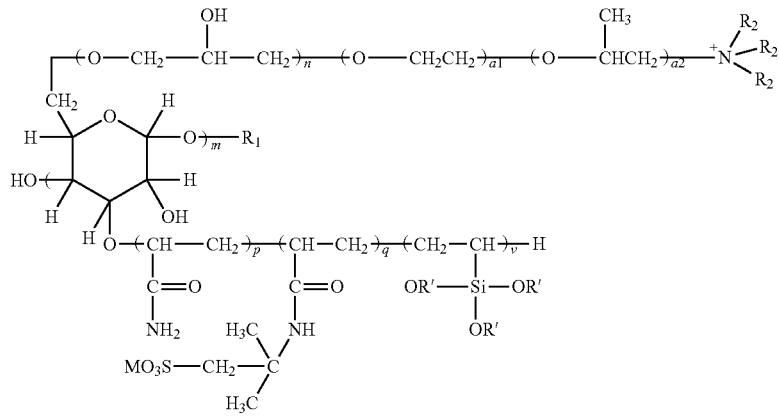
(I-3)
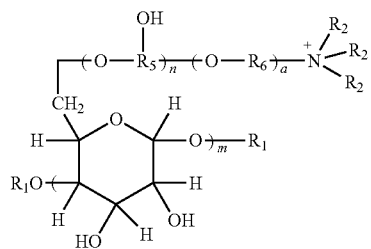
(II-1)

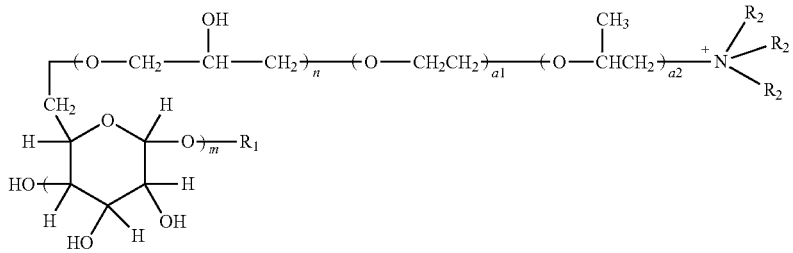
(II-2)
According to an embodiment of the present invention, in the formula (II-2), it is preferable that a1=0, a2=0, and n=1.
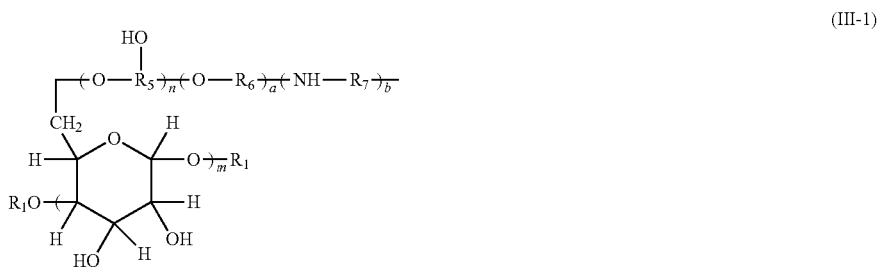
(III-1)
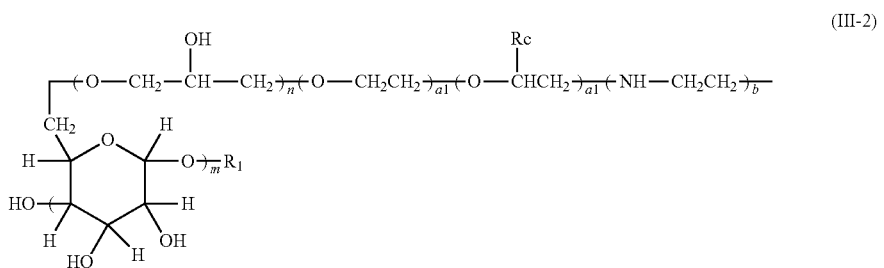
(III-2)
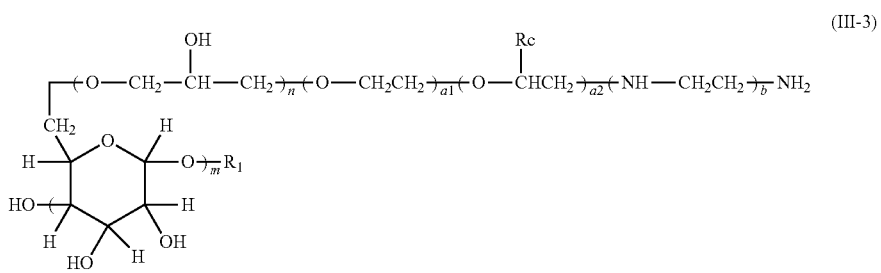
(III-3)
According to an embodiment of the present invention, in the formula (III-3), it is preferable that n is 0, Rc is methyl, a1 is a number of 0 to 3 (such as a number of 1 to 2), a2 is a number of 0 to 3 (such as a number of 1 to 2), b is a number of 1 to 4 (such as a number of 2 to 3), and m is 1.

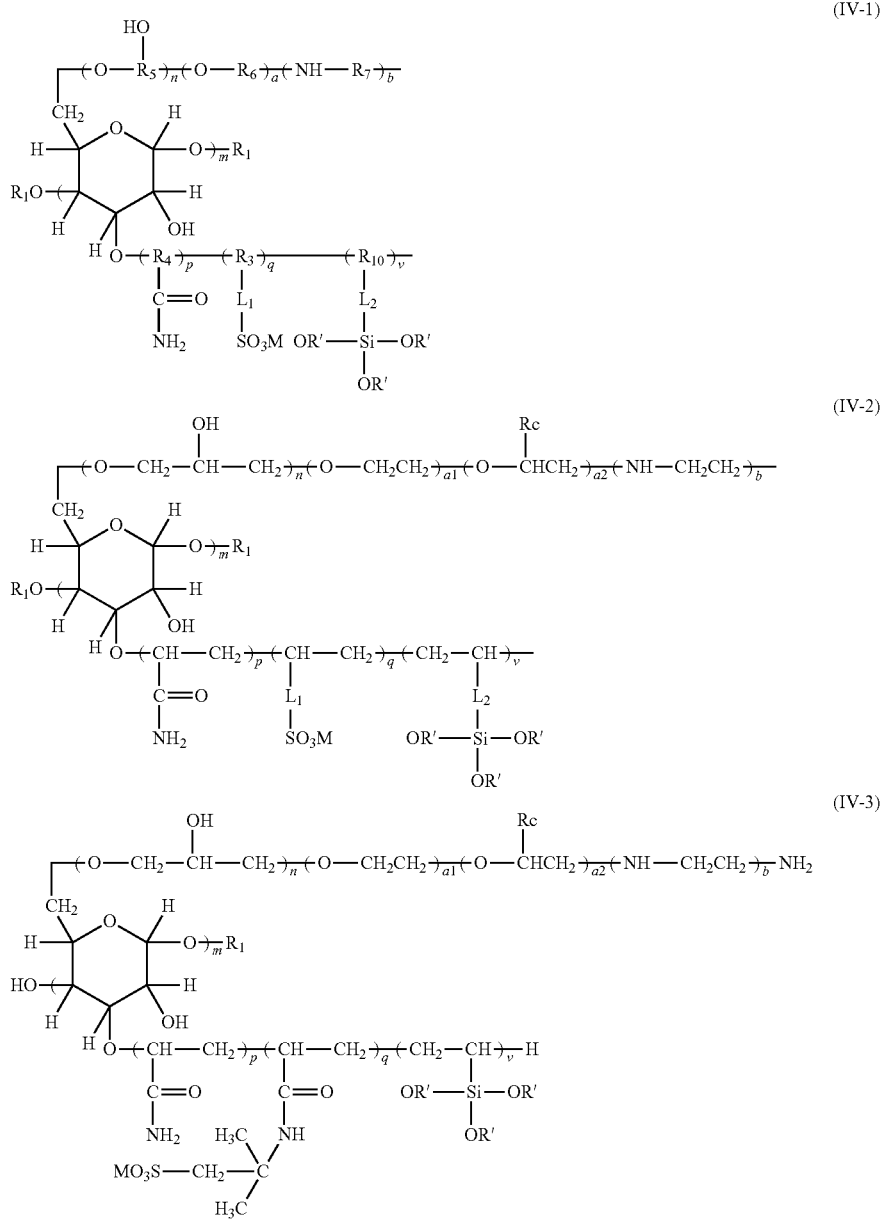

According to an embodiment of the present invention, in the formula (IV-3), it is preferable that n is 0, a1 is 0, a2 is a number of 1 to 3 (e.g., a number of 1 to 2), and b is a number of 1 to 5 (e.g., a number of 2 to 4).

According to the present invention, all of the aforementioned formulas (I-1) to (IV-3) are obtained by bonding the substituent A, the substituent B and the substituent C, individually or in various combinations, to a glucose residue or a glucose glycoside residue (simply called as a residue) represented schematically by the formula (1). Accordingly, all substituents and numbers in these formulas directly apply to the corresponding definitions in these substituents and residues, although certain formulas (such as formula (IV-3)) also provide specific definitions of certain substituents or numbers therein preferably.

According to an embodiment of the present invention, the cationicity of the substituted saccharide or glycoside (such as the particular mixture) ranges generally from 0.10 to 0.80 mmol/g, preferably from 0.25 to 0.50 mmol/g.

According to an embodiment of the present invention, the amine value of the substituted saccharide or glycoside (e.g. of the particular mixture) ranges generally from 0.40 to 1.65 mmol/g, preferably from 0.83 to 1.32 mmol/g.

According to an embodiment of the present invention, said particular mixture is a mixture of at least three of said compound P, said compound X, said compound Y and said compound Z, in particular a mixture of said compound X, said compound Y and said compound Z, more in particular a mixture of one or more compounds schematically represented by formula (II-2) (preferably a1=0, a2=0, and n=1), one or more compounds schematically represented by formula (III-3) (preferably n is 0, Rc is methyl, a1 is a number of 0-3 (such as a number of 1-2), a2 is a number of 0-3 (such as a number of 1-2), b is a number of 1-4 (such as a number of 2-3), and m is 1) and one or more compounds schematically represented by formula (IV-3) (preferably n is 0, a1 is 0, a2 is a number of 1-3 (e.g., a number of 1-2), and b is a number of 1-5 (e.g., a number of 2-4)).

According to an embodiment of the present invention, the weight ratio of said compound X, said compound Y and said compound Z in said particular mixture may be 20-30:30-40:10-25.

According to an embodiment of the present invention, the number average molecular weight of the compound X (such as a compound schematically represented by the formula (II-2), wherein it is preferably a1=0, a2=0, and n=1) is generally 340-1500, preferably 500-1200.

According to an embodiment of the present invention, the cationicity of the compound X (such as a compound schematically represented by the formula (II-2), wherein it is preferable that a1=0, a2=0, and n=1) ranges generally 0.40-1.70 mmol/g, preferably 1.10-1.35 mmol/g.

According to an embodiment of the present invention, the compound X can be produced according to a process comprising, for example: carrying out hydrolysis reaction on epoxy chloropropane, water and a catalyst to obtain a 3-chloro-1,2-propanediol aqueous solution; reacting the 3-chloro-1,2-propanediol aqueous solution with glucoside to obtain a chlorohydrin glucoside aqueous solution; and reacting the chlorohydrin glucoside aqueous solution with a tertiary amine to obtain the compound X.

According to an embodiment of the present invention, in the process for producing the compound X, the catalyst is, for example, an inorganic acid or an organic acid. The inorganic acid is, for example, sulfuric acid, nitric acid or phosphoric acid, and the organic acid is preferably toluenesulfonic acid, dodecylbenzenesulfonic acid or sulfamic acid.

According to an embodiment of the present invention, in the process for producing compound X, the molar ratio of epichlorohydrin, water and catalyst is generally 1:(12-20):(0.02-0.12).

According to an embodiment of the present invention, in the process for producing the compound X, the hydrolysis reaction is preferably carried out at a temperature of 60° C. to 100° C. for preferably 3 h to 8 h.

According to an embodiment of the present invention, in the process for producing the compound X, the glycoside is, for example, methyl glycoside, ethyl glycoside, ethylene glycol glycoside, propyl glycoside, or butyl glycoside.

According to an embodiment of the present invention, in the process for producing the compound X, the molar ratio of the 3-chloro-1,2-propanediol aqueous solution to the glycoside is preferably (0.5 to 5): 1.

According to an embodiment of the present invention, in the process for producing the compound X, the 3-chloro-1,2-propanediol aqueous solution and the glycoside are preferably reacted at a temperature of 80° C. to 110° C. for 0.5 h to 4 h.

According to an embodiment of the present invention, in the process for producing compound X, the tertiary amine is preferably trimethylamine, triethylamine, tripropylamine, tributylamine, hexyldimethyl tertiary amine, octyldimethyl tertiary amine, decyldimethyl tertiary amine, or dodecyldimethyl tertiary amine.

According to an embodiment of the present invention, in the process for producing the compound X, the molar ratio of the chlorohydrin glycoside to the tertiary amine is preferably 1:(0.2-1.2).

According to an embodiment of the present invention, in the process for producing the compound X, the chlorohydrin glycoside aqueous solution and the tertiary amine are preferably reacted at a pH of 6 to 9. Accordingly, the pH is preferably adjusted using a neutralizing agent. Here, the neutralizing agent is preferably sodium hydroxide, potassium hydroxide or sodium carbonate.

According to an embodiment of the present invention, in the process for producing the compound X, the reaction between the chlorohydrin glycoside aqueous solution and the tertiary amine is preferably carried out at a temperature of 40° C. to 80° C. for preferably 3 to 10 hours.

According to an embodiment of the present invention, the number average molecular weight of the compound Y (such as a compound schematically represented by the formula (III-3), wherein preferably n is 0, Rc is methyl, a1 is a number of 0-3 (such as a number of 1-2), a2 is a number of 0-3 (such as a number of 1-2), b is a number of 1-4 (such as a number of 2-3), and m is 1) is generally 240-950, preferably 300-800.

According to an embodiment of the present invention, the amine value of the compound Y (such as the compound represented schematically by the formula (III-3), wherein preferably n is 0, Rc is methyl, a1 is a number ranging from 0 to 3 (such as a number ranging from 1 to 2), a2 is a number ranging from 0 to 3 (such as a number ranging from 1 to 2), b is a number ranging from 1 to 4 (such as a number ranging from 2 to 3), and m is 1) is generally from 1.20 to 2.60 mmol/g, preferably from 1.80 to 2.20 mmol/g.

According to an embodiment of the present invention, the compound Y can be produced by a process comprising, for example: reacting an epoxide, glucoside, water and a catalyst to obtain an intermediate product; and reacting the intermediate product with an organic amine to obtain the compound Y.

According to an embodiment of the present invention, in the process for producing the compound Y, the epoxide is preferably ethylene oxide or propylene oxide.

According to an embodiment of the present invention, in the process for producing the compound Y, the glycoside is preferably methyl glycoside, ethyl glycoside, propyl glycoside, or butyl glycoside.

According to an embodiment of the present invention, in the process for producing the compound Y, the catalyst is preferably an inorganic acid or an organic acid. Here, the inorganic acid is preferably sulfuric acid, nitric acid, sulfuric acid, or phosphotungstic acid; and the organic acid is preferably p-toluenesulfonic acid, dodecylbenzenesulfonic acid, or sulfamic acid.

According to an embodiment of the present invention, in the process for producing the compound Y, the molar ratio of the epoxide, the glycoside, water, and the catalyst is preferably 1:(0.5-1):(4-8):(0.01-0.1), more preferably 1:(0.6-0.8):(5-6):(0.03-0.08).

According to an embodiment of the present invention, in the process for producing the compound Y, the epoxide, the glycoside, water and the catalyst are reacted at a temperature preferably ranging from 50° C. to 110° C. under a pressure generally ranging from 3 MPa to 10 MPa, for preferably 0.5 h to 4 h.

According to an embodiment of the present invention, in the process for producing the compound Y, the organic amine is preferably ethylenediamine, diethylenetriamine, triethylenetetramine, or tetraethylenepentamine.

According to an embodiment of the present invention, in the process for producing the compound Y, the molar ratio of the intermediate product to the organic amine is preferably 1:(0.8-1.2).

According to an embodiment of the present invention, in the process for producing the compound Y, the intermediate and the organic amine are reacted at a pH of preferably 6 to 9, at a temperature of preferably 40° C. to 90° C., for preferably 3 h to 10 h.

According to an embodiment of the present invention, the number average molecular weight of the compound Z (such as a compound schematically represented by the formula (IV-3), wherein preferably n is 0, a1 is 0, a2 is a number of 1-3 (such as a number of 1-2), and b is a number of 1-5 (such as a number of 2-4)) is generally 790-5500, more preferably 1000-5000.

According to an embodiment of the present invention, the amine value of the compound Z (such as a compound represented schematically by the formula (IV-3), wherein preferably n is 0, a1 is 0, a2 is a number ranging from 1 to 3 (such as a number ranging from 1 to 2), and b is a number ranging from 1 to 5 (such as a number ranging from 2 to 4)) is generally from 0.30 to 1.10 mmol/g, preferably from 0.60 to 0.85 mmol/g.

According to an embodiment of the present invention, the compound Z can be produced by a process comprising, for example: reacting a glucoside, an epoxide, a chloride and a catalyst to obtain a first intermediate product; reacting the first intermediate product, water and an organic amine to obtain a second intermediate product; and polymerizing the second intermediate product, an acrylamide, optionally 2-acrylamide-2-methylpropanesulfonic acid and optionally vinyltriethoxysilane under the action of an initiator to obtain the compound Z.

According to an embodiment of the present invention, in the process for producing the compound Z, the glycoside is preferably methyl glycoside, ethyl glycoside, propyl glycoside, or butyl glycoside.

According to an embodiment of the present invention, in the process for producing compound Z, the epoxide is preferably propylene oxide, butylene oxide or pentylene oxide.

According to an embodiment of the present invention, in the process for producing compound Z, the chloride is preferably thionyl chloride, sulfuryl chloride, phosphorus trichloride or phosphorus pentachloride.

According to an embodiment of the present invention, in the process for producing the compound Z, the catalyst is preferably hydrofluoric acid, tartaric acid, oxalic acid, or p-toluenesulfonic acid.

According to an embodiment of the present invention, in the process for producing the compound Z, the glycoside, the epoxide, the chloride, and the catalyst are preferably present in a weight ratio of (40-80):(8-12):(9-11):(0.8-1.6), more preferably (50-70):(9-11): 10:(1-1.4).

According to an embodiment of the present invention, in the process for producing the compound Z, the glycoside, the epoxide, the chloride and the catalyst are reacted at a temperature preferably ranging from 40° C. to 70° C. under a pressure preferably ranging from 1 MPa to 4 MPa, for preferably 0.5 h to 3 h.

According to an embodiment of the present invention, in the process for producing the compound Z, the organic amine is preferably ethylenediamine, diethylenetriamine, triethylenetetramine, or tetraethylenepentamine.

According to an embodiment of the present invention, in the process for producing compound Z, the first intermediate product, water, and organic amine are reacted at a temperature of preferably 180° C. to 220° C. for preferably 2 h to 4 h.

According to an embodiment of the present invention, in the process for producing the compound Z, the initiator is preferably ammonium sulfate, potassium permanganate, cerium ammonium nitrate, or tert-butyl hydroperoxide.

According to an embodiment of the present invention, in the process for producing the compound Z, the polymerization reaction is carried out at a pH of preferably 8 to 10, at a temperature of preferably 40° C. to 60° C., for preferably 4 h to 6 h.

According to an embodiment of the present invention, the invention also relates to a drilling fluid composition. The drilling fluid composition comprises at least a drilling fluid base fluid and optionally at least one treating agent. Here, the drilling fluid base fluid consists of any of the substituted saccharides or glycosides of the invention as described above and water.

According to an embodiment of the present invention, the substituted saccharide or glycoside is present in the drilling fluid base fluid in an amount of 60 to 95 wt %, based on 100 wt % of the drilling fluid base fluid, where the balance may be water.

According to an embodiment of the present invention, the drilling fluid base fluid generally comprises 20-30% by weight of the compound X (such as a compound schematically represented by the formula (II-2), wherein preferably a1=0, a2=0, and n=1), 30-40% by weight of the compound Y (such as a compound schematically represented by the formula (III-3), wherein preferably n is 0, Rc is methyl, a1 is a number of 0-3 (such as a number of 1-2), a2 is a number of 0-3 (such as a number of 1-2), b is a number of 1-4 (such as a number of 2-3), and m is 1), and 10-25% by weight of the compound Z (such as a compound schematically represented by the formula (IV-3), where preferably n is 0, a1 is 0, a2 is a number ranging from 1 to 3 (e.g., a number ranging from 1 to 2), and b is a number ranging from 1 to 5 (e.g., a number ranging from 2 to 4)), based on 100 wt % of the drilling fluid base fluid.

According to an embodiment of the present invention, the at least one treating agent is at least one selected from the group consisting of tackifier, flow form modifier, filtration loss reducer, high temperature stabilizer, plugging agent, inhibition enhancer, and pH adjuster.

According to an embodiment of the present invention, the drilling fluid composition generally comprises 0.5 parts by weight to 1.5 parts by weight of a tackifier, relative to 100 mL of the drilling fluid base fluid. Here, the tackifier may be those conventionally known in the art, such as one or more selected from the group consisting of xanthan gum, high-viscosity polyanionic cellulose sodium salt, high-viscosity carboxymethyl cellulose sodium salt, and polyacrylamide potassium salt, more preferably xanthan gum, high-viscosity polyanionic cellulose sodium salt, high-viscosity carboxymethyl cellulose sodium salt, and polyacrylamide potassium salt. The weight ratio of the xanthan gum, the high-viscosity polyanion cellulose sodium salt, the high-viscosity carboxymethylcellulose sodium salt and the polyacrylamide potassium salt is preferably 1:(0.5-1.5):(0.5-1.5):(0.75-2), more preferably 1:1:1:(0.75-2). Preferably, the xanthan gum has a viscosity of preferably 1200 cps to 1600 cps, a pH of preferably 6.5 to 8, a moisture content of preferably ≤13%, an ash content of preferably ≤13%, and a particle size of preferably 180 μm to 355 μm. Preferably, the high-viscosity polyanion cellulose sodium salt is a cellulose ether derivative prepared from a series of complex chemical reactions of natural cotton short fibers, which is an important water-soluble anionic cellulose ether; where the high-viscosity polyanion cellulose sodium has a water content of preferably ≤10%, a purity of preferably ≥95%, a substitution degree of preferably ≥0.8%, a pH value of preferably 6.5-8, of sodium chloride content of preferably ≤5%, and a viscosity of a 2% aqueous solution of preferably ≥1000 mPa·s. Preferably, the high-viscosity carboxymethyl cellulose sodium salt is prepared by reacting cotton fibers and chloroacetic acid; where the high-viscosity carboxymethyl cellulose sodium salt has a water content of preferably ≤10%, a purity of preferably ≥95%, a substitution degree of preferably ≥0.8%, a pH value of preferably 6.5-8, a sodium chloride content of preferably ≤5%, and a viscosity of a 2% aqueous solution of preferably ≥1000 mPa·s. Preferably, the polyacrylamide potassium salt has a water content of preferably ≤10%, a residue on sieve of preferably ≤10%, a purity of preferably ≥80%, a potassium content of preferably 11%-16%, a hydrolysis degree of preferably 27%-35%, a chloride ion content of preferably ≤1%, and an intrinsic viscosity of preferably ≥6100 mL/g. The source of the tackifier is not particularly limited in the present invention, while commercially available products known to those skilled in the art may be used. Preferably, the treating agent comprises 0.5 parts by weight to 1.5 parts by weight of the tackifier.

According to an embodiment of the present invention, the drilling fluid composition generally comprises 1 to 3 parts by weight of a flow form modifier, relative to 100 mL of the drilling fluid base fluid. Here, the flow form modifier may be those conventionally known in the art, such as one selected from sodium bentonite and/or dextrin, more preferably sodium bentonite or dextrin. Preferably, the sodium bentonite has a moisture content of preferably ≤10%, a purity of preferably ≥80%, a substitution degree of preferably ≥0.8%, a pH value of preferably 7-9, a chloride content of preferably ≤20%, and a viscosity of a 2% aqueous solution of preferably less than 200 mPa·s; and the dextrin has a moisture content of preferably ≤10%, a purity of preferably ≥80%, a substitution degree of preferably ≥0.8%, a pH value of preferably 7-9, a chloride content of preferably ≤20%, and a viscosity of a 2% aqueous solution of preferably less than 400 mPa·s. The source of the flow form modifier is not particularly limited in the present invention, while commercially available products known to those skilled in the art can be used. Preferably, the treating agent comprises 1 to 3 parts by weight of the flow form modifier.

According to an embodiment of the present invention, the drilling fluid composition generally comprises 0.8 parts by weight to 1.2 parts by weight of a filtration loss reducer, relative to 100 mL of the drilling fluid base fluid. Here, the filtration loss reducer may be those conventionally known in the art, such as one selected from low viscosity carboxymethyl cellulose sodium and/or carboxymethyl starch sodium, more preferably low viscosity carboxymethyl cellulose sodium or carboxymethyl starch sodium. Preferably, the low-viscosity carboxymethyl cellulose sodium has a water content of preferably ≤10%, a purity of preferably ≥80%, a substitution degree of preferably ≥0.8%, a pH value of preferably 7-9, a chloride content of preferably ≤20%, and a viscosity of a 2% aqueous solution of preferably less than 200 mPa·s; and the carboxymethyl starch sodium has a particle size of preferably 90-110 mesh, a sodium chloride content of preferably <7%, a degree of substitution of preferably >0.2%, a pH value of preferably 8-9, a moisture content of preferably <10%, and a viscosity of a 2% aqueous solution of 80-120 mpa·s. The source of the filtration loss reducer is not particularly limited, and commercially available products known to those skilled in the art may be used. Preferably, the treating agent comprises 0.8 to 1.2 parts by weight of the filtration loss reducer.

According to an embodiment of the present invention, the drilling fluid composition generally comprises 2 parts by weight to 4 parts by weight of a high temperature stabilizer, relative to 100 mL of the drilling fluid base fluid. Here, the high temperature stabilizer may be those conventionally known in the art, such as one selected from sulfonated phenol resin and/or sulfonated lignite, more preferably sulfonated phenol resin or sulfonated lignite. Preferably, the sulfonated phenolic resin has a water content of preferably ≤10%, a purity of preferably ≥80%, a substitution degree of preferably ≥0.8%, a pH value of preferably 7-9, a chloride content of preferably ≤20%, and a viscosity of a 2% aqueous solution of preferably 1<300 mPa·s; and the sulfonated lignite has a water content of preferably ≤10%, a purity of preferably ≥80%, a substitution degree of preferably ≥0.8%, a pH value of preferably 7-9, a chloride content of preferably ≤20%, and a viscosity of a 2% aqueous solution of preferably <200 mPa·s. The source of the high temperature stabilizer in the present invention is not particularly limited, while commercially available products known to those skilled in the art may be used. Preferably, the treating agent comprises 2 to 4 parts by weight of the high temperature stabilizer.

According to an embodiment of the present invention, the drilling fluid composition generally comprises 2 parts by weight to 4 parts by weight of a plugging agent, relative to 100 mL of the drilling fluid base fluid. Here, the plugging agent may be those conventionally known in the art, such as one or more selected from calcium carbonate, oil-soluble resin, non-penetrating plugging agent, and sulfonated asphalt, more preferably calcium carbonate, oil-soluble resin, non-penetrating plugging agent, or sulfonated asphalt. Preferably, the calcium carbonate has a particle size of preferably 800 meshes to 1200 meshes, a moisture content of preferably ≤10%, and a content of acid insoluble substances of preferably ≤1%; and the sulfonated asphalt has a pH value of preferably 8-9, a water content of preferably ≤8%, a sodium sulfonate group content of preferably ≤10%, a water-soluble substance of preferably ≥70%, an oil-soluble substance of preferably ≥25%, and an HTHP filtration loss of preferably ≤25 mL/30 min. The source of the plugging agent is not particularly limited in the present invention, while commercially available products known to those skilled in the art may be used. Preferably, the treating agent comprises 2 parts by weight to 4 parts by weight of the plugging agent.

According to an embodiment of the present invention, the drilling fluid composition generally comprises 10 parts by weight to 24 parts by weight of an inhibition enhancer, relative to 100 mL of the drilling fluid base fluid. Here, the inhibition enhancer may be those conventionally known in the art, such as one or more selected from the group consisting of sodium chloride, potassium chloride, calcium chloride, and potassium formate, more preferably sodium chloride, potassium chloride, calcium chloride, or potassium formate. The source of the inhibition enhancer is not particularly limited in the present invention, while commercially available products known to those skilled in the art can be used. Preferably, the treating agent comprises 10 parts by weight to 24 parts by weight of the inhibition enhancer.

According to an embodiment of the present invention, the drilling fluid composition generally comprises 2 parts by weight to 4 parts by weight of a pH adjuster, relative to 100 mL of the drilling fluid base fluid. Here, the pH adjustor may be those conventionally known in the art, such as one or more selected from the group consisting of sodium hydroxide, potassium hydroxide, sodium carbonate and potassium carbonate, more preferably sodium hydroxide, potassium hydroxide, sodium carbonate or potassium carbonate. The source of the pH adjuster is not particularly limited in the present invention, while commercially available products known to those skilled in the art may be used. Preferably, the treating agent comprises 2 parts by weight to 4 parts by weight of a pH adjusting agent.

According to an embodiment of the present invention, the at least one treating agent is generally used in an amount of 10 to 70 g, preferably 18.3 to 41.7 g, in the drilling fluid composition, relative to 100 mL of the drilling fluid base fluid. Preferably, in the drilling fluid composition, 0.5-1.5 g of the tackifier, 1-3 g of the flow form modifier, 0.8-1.2 g of the filtration loss reducer, 2-4 g of the high-temperature stabilizer, 2-4 g of the plugging agent, 10-24 g of the inhibition reinforcing agent and 2-4 g of the pH adjuster are used per 100 mL of the drilling fluid base fluid.

According to an embodiment of the present invention, the invention also relates to a process for producing the drilling fluid composition. The process for producing the drilling fluid composition comprises the step of mixing any of the substituted saccharides or glycosides of the present invention as described above, water and optionally at least one treating agent (called as a mixing step).

According to an embodiment of the present invention, in the mixing step, it is preferable that the substituted saccharide or glycoside is firstly mixed with water and then the mixture obtained is mixed optionally with the at least one treating agent. More preferably, the compound X, the compound Y and the compound Z are mixed with water before the mixture obtained (corresponding to a drilling fluid base fluid) is mixed optionally with the at least one treating agent.

According to an embodiment of the present invention, in the mixing step, it is preferable that the tackifier, the flow form modifier and the filtration loss reducer are added to the drilling fluid base fluid for a first mixing, and then the high temperature stabilizer, the plugging agent, the inhibition enhancer and the pH adjuster are added for a second mixing.

According to an embodiment of the present invention, in the mixing step, the mixing is performed under high speed stirring, for example, at a rotation speed of preferably 5000 r/min to 10000 r/min, for preferably 10 min to 30 min.

According to an embodiment of the present invention, the process for producing the drilling fluid composition further comprises optionally a step of subjecting the mixture obtained in the mixing step to an aging treatment (called as aging step).

According to an embodiment of the present invention, in the aging step, the temperature for treatment is generally 120-200° C. or 140-180° C., preferably 155-165° C., and the duration for treatment is generally 10-30 hours or 15-20 hours, preferably 15-17 hours.

EXAMPLES

The present invention will be described in further detail below referring to examples and comparative examples, but the present invention is not limited thereto.

The raw materials used in the following examples were all commercially available products. Specifically, the high-viscosity polyanionic cellulose sodium salt used was a high-viscosity polyanionic cellulose sodium salt, HV-PAC, available from Puyang Zhongyuan Sanli Industry Co., Ltd.; the high viscosity carboxymethyl cellulose sodium salt was a high viscosity carboxymethyl cellulose sodium, HV-CMC, available from by Puyang Zhongyuan Sanli Industry Co., Ltd.; the xanthan gum used was a xanthan gum, XC, available from Puyang Zhongyuan Sanli Industry Co., Ltd.; the low viscosity carboxymethyl cellulose sodium salt used was a low viscosity carboxymethyl cellulose sodium, LV-CMC, available from Puyang Zhongyuan Sanli Industry Co., Ltd.; the carboxymethyl starch sodium used was a carboxymethyl starch sodium, CMS-Na, available from Puyang Zhongyuan Sanli Industry Co., Ltd.; the calcium carbonate used was a QS-2 ultrafine mesh calcium carbonate with a particle size of 1000 mesh, available from Puyang Zhongyuan Sanli Industry Co., Ltd.; the oil-soluble resin used was a 2420 type oil-soluble resin, available from Zheng Zhou Sanxiangdiamond company; the non-permeable plugging agent used was a WLP type non-permeable plugging agent, available from Shandong Shunyuan Petroleum Sci.&Tech. Co., Ltd.; the potassium polyacrylamide salt used was potassium polyacrylamide, KPAM, available from Puyang Chengxin Oilfield Chemical Co., Ltd.; the sodium bentonite used was a sodium bentonite available from Weifang Dragon Bentonite Co., Ltd.; the dextrin used was a dextrin available from Gongyi Yonghong Dextrin company; the sulfonated phenolic resin used was a sulfonated phenolic resin available from Puyang Puzhong chemical industry Co., Ltd; the sulfonated lignite used was a sulfonated lignite available from Puyang Puzhong chemical industry Co., Ltd; the sulfonated asphalt used was a sulfonated asphalt available from the Xinxiang Seventh Chemical Industry Co., Ltd.

Example 1

0.2 mol of epichlorohydrin, 2.4 mol of distilled water and 0.004 mol of p-toluenesulfonic acid were added into a high-pressure reactor equipped with a thermometer, a condenser pipe and a stirrer, and reacted for 3 h under normal pressure at 60° C., to provide an aqueous solution of 3-chloro-1,2-propanediol;

the aqueous solution of 3-chloro-1,2-propanediol was cooled to room temperature, 0.4 mol of methylglycoside was added thereto, and reacted for 0.5 h under normal pressure at 80° C., to provide a solution of chlorohydrin glucoside;

the solution of chlorohydrin glucoside was neutralized with a saturated aqueous solution of sodium hydroxide to pH 7, then 0.4 mol of an aqueous solution of 33.3% trimethylamine was added to the bottom of the chlorohydrin glucoside solution, the addition being controlled to be accomplished within 1 h, and reacted at 40° C., to provide a substituted glucoside component; with a yield of product of 95.25%. The cationicity of the product of example 1 was 0.40 mmol/g.

The substituted glucoside component produced by example 1 was subjected to an infrared detection, providing a detection result as showed in FIG. 1, which showed characteristic peaks at 1034, 1300, and 2400 cm$^{-1}$, confirming the presence of the substituent A. The substituted glucoside component produced by example 1 had a schematic structure showed by formula 1:

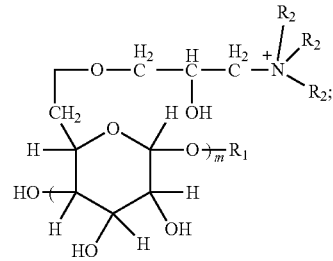

Formula 1

In the formula 1, $R_1$ is —$CH_3$, $R_2$ is —$CH_3$, and m is 1.4.

Example 2

0.2 mol of epichlorohydrin, 3.2 mol of distilled water and 0.014 mol of p-sulfamic acid were added into a high-pressure reactor equipped with a thermometer, a condenser pipe and a stirrer, and reacted for 6 h under normal pressure at 80° C., to provide an aqueous solution of 3-chloro-1,2-propanediol;

the aqueous solution of 3-chloro-1,2-propanediol was cooled to room temperature, 0.22 mol of ethylglycoside was added thereto, and reacted for 3 h under normal pressure at 90° C., to provide a solution of chlorohydrin glucoside;

the solution of chlorohydrin glucoside was neutralized with a saturated aqueous solution of potassium hydroxide to pH 7, then 0.2 mol of an aqueous solution of trimethylamine was added to the bottom of the chlorohydrin glucoside solution, the addition being controlled to be accomplished within 1 h, and reacted at 60° C. for 7 h, to provide a substituted glucoside component; with a yield of product of 93.57%. The cationicity of the product of example 2 was 1.10 mmol/g.

The substituted glucoside component produced by example 2 was subjected to an infrared detection, providing a detection result showing characteristic peaks at 1035, 1301, and 2403 cm$^{-1}$, confirming the presence of the substituent A. The substituted glucoside component produced by example 2 had a schematic structure showed by formula 2:

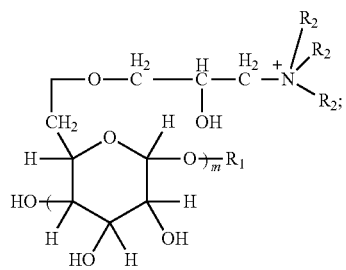

formula 2

In formula 2, $R_1$ is —$C_2H_5$, $R_2$ is —$CH_3$, and m is 1.4.

Example 3

0.2 mol of epichlorohydrin, 3.2 mol of distilled water and 0.014 mol of concentrated sulfuric acid were added into a high-pressure reactor equipped with a thermometer, a condenser pipe and a stirrer, and reacted for 4 h under normal pressure at 70 degrees C., to provide an aqueous solution of 3-chloro-1,2-propanediol; the aqueous solution of 3-chloro-1,2-propanediol was cooled to room temperature, 0.22 mol of propyl glycoside was added thereto, and reacted for 4 h under normal pressure at 100° C., to provide a solution of chlorohydrin glucoside;

the solution of chlorohydrin glucoside was neutralized with a saturated sodium carbonate to pH 8, then 0.2 mol of an tripropyl amine was added to the bottom of the chlorohydrin glucoside solution, the addition being controlled to be accomplished within 1 h, and reacted at 50° C. for 4 h, to provide a substituted glucoside component; with a yield of product of 94.03%. The cationicity of the product of example 3 was 1.35 mmol/g.

The substituted glucoside component produced by example 3 was subjected to an infrared detection, providing a detection result showing characteristic peaks at 1036, 1305 and 2405 cm$^{-1}$, confirming the presence of the substituent A. The substituted glucoside component produced by example 3 had a schematic structure showed by formula 3:

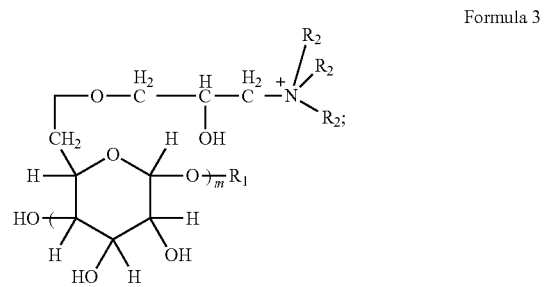

Formula 3

In formula 3, $R_1$ is —$C_3H_7$, $R_3$ is —$C_3H_7$, and m is 1.4.

Example 4

0.2 mol of epichlorohydrin, 3.2 mol of distilled water and 0.014 mol of concentrated phosphoric acid were added into a high-pressure reactor equipped with a thermometer, a condenser pipe and a stirrer, and reacted for 5 h under normal pressure at 80° C., to provide an aqueous solution of 3-chloro-1,2-propanediol;

the aqueous solution of 3-chloro-1,2-propanediol was cooled to room temperature, 0.22 mol of butyl glycoside was added thereto, and reacted for 3 h under normal pressure at 90° C., to provide a solution of chlorohydrin glucoside;

the solution of chlorohydrin glucoside was neutralized with a saturated sodium hydroxide to pH 9, then 0.2 mol of an tributyl amine was added to the bottom of the chlorohydrin glucoside solution, the addition being controlled to be accomplished within 1 h, and reacted at 80° C. for 8 h, to provide a substituted glucoside component; with a yield of product of 94.4%. The cationicity of the product of example 4 was 1.70 mmol/g.

The substituted glucoside component produced by example 4 was subjected to an infrared detection, providing a detection result showing characteristic peaks at 1032, 1301, and 2409 cm$^{-1}$, confirming the presence of the substituent A. The substituted glucoside component produced by example 4 had a schematic structure showed by formula 4:

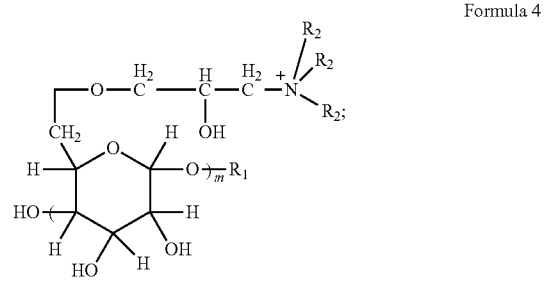

Formula 4

In formula 4, $R_1$ is —$C_4H_9$, $R_2$ is —$C_4H_9$, and m is 1.4.

Example 5

44.05 g of ethylene oxide, 97 g of methylglycoside, 72 g of distilled water and 1.72 g of p-toluenesulfonic acid were added into a high-pressure reactor equipped with a thermometer, a condenser pipe and a stirrer, and reacted for 0.5 h under normal 3 MPa at 50° C., to provide an intermediate product;

the intermediate product was neutralized with a neutralizer of NaOH to pH6, 24 g of ethylene diamine was added, and reacted for 3 h at a temperature of 40° C. under normal pressure. The reaction product obtained was removed with water to provide a substituted glucoside component. The product from example 5 had an amine value of 1.20 mmol/g.

The substituted glucoside component produced by example 5 was subjected to an infrared detection, providing a detection result showing characteristic peaks at 1501, 1650, and 3386 cm$^{-1}$, confirming the presence of the substituent C. The substituted glucoside component produced by example 5 had a schematic structure showed by formula 5:

Formula 5

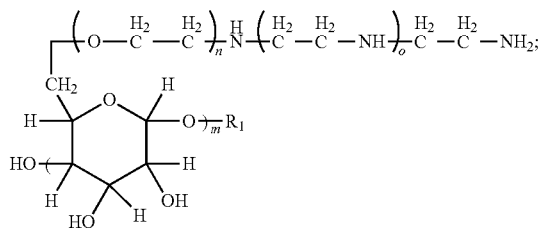

In formula 5, m is 1.4, $R_1$ is —$CH_3$, n is 1, and o is 0.

Example 6

44.05 g of ethylene oxide, 104 g of ethylglycoside, 90 g of distilled water and 1.96 g of sulfuric acid were added into a high-pressure reactor equipped with a thermometer, a condenser pipe and a stirrer, and reacted for 1 h under 4 MPa at 60° C., to provide an intermediate product;

the intermediate product was neutralized with a neutralizer of NaOH to pH6, 51.59 g of diethylenetriamine was added, and reacted for 4 h at a temperature of 50° C. under normal pressure. The reaction product obtained was removed with water to provide a substituted glucoside component. The product from example 6 had an amine value of 1.76 mmol/g.

The substituted glucoside component produced by example 6 was subjected to an infrared detection, providing a detection result showing characteristic peaks at 901, 1623 and 3349 cm$^{-1}$, confirming the presence of the substituent C. The substituted glucoside component produced by example 6 had a schematic structure showed by formula 6:

Formula 6

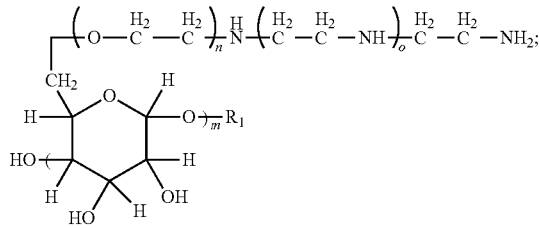

In formula 6, m is 1.4, $R_1$ is —$C_2H_5$, n is 1, and o is 1.

Example 7

44.05 g of ethylene oxide, 133 g of propyl glycoside, 108 g of distilled water and 1.89 g of nitric acid were added into a high-pressure reactor equipped with a thermometer, a condenser pipe and a stirrer, and reacted for 1.5 h under 5 MPa at 70° C., to provide an intermediate product;

the intermediate product was neutralized with a neutralizer of KOH to pH7, 87.74 g of triethylene tetramine was added, and reacted for 5 h at a temperature of 60° C. under normal pressure. The reaction product obtained was removed with water to provide a substituted glucoside component. The product from example 7 had an amine value of 1.95 mmol/g.

The substituted glucoside component produced by example 7 was subjected to an infrared detection, providing a detection result showing characteristic peaks at 905, 1627 and 3338 cm$^{-1}$, confirming the presence of the substituent C. The substituted glucoside component produced by example 7 had a schematic structure showed by formula 7:

Formula 7

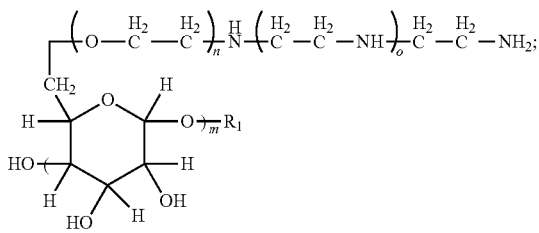

In formula 7, m is 1.4, $R_1$ is —$C_3H_7$, n is 1, and o is 2.

Example 8

58.08 g of ethylene oxide, 165 g of butyl glycoside, 126 g of distilled water and 3.92 g of phosphotungstic acid were added into a high-pressure reactor equipped with a thermometer, a condenser pipe and a stirrer, and reacted for 2 h under 7 MPa at 80° C., to provide an intermediate product;

the intermediate product was neutralized with a neutralizer of sodium carbonate to pH8, 132.52 g of tetraethylenepentamine was added, and reacted for 7 h at a temperature of 70° C. under normal pressure. The reaction product obtained was removed with water to provide a substituted glucoside component. The product from example 8 had an amine value of 2.59 mmol/g.

The substituted glucoside component produced by example 8 was subjected to an infrared detection, providing a detection result showing characteristic peaks at 901, 1622 and 3349 cm$^{-1}$, confirming the presence of the substituent C. The substituted glucoside component produced by example 8 had a schematic structure showed by formula 8:

43

Formula 8

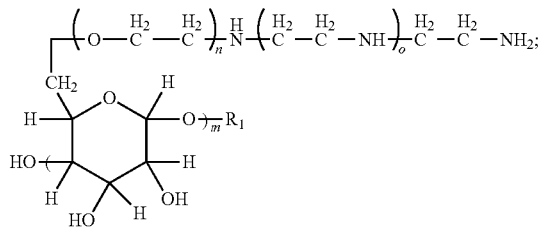

In formula 8, m is 1.4, $R_1$ is —$C_4H_9$, n is 1, and o is 3.

Example 9

40 g of methylglycoside, 8 g of propylene oxide, 9 g of thionyl chloride and 0.8 g of hydrofluoric acid were added into an HTHP reactor, for which nitrogen was used to purge air, and nitrogen was used to increase the pressure to 1.0 MPa, stirred, and the temperature was increased to 40° C. and reacted for 0.5 h, to provide a first intermediate product; 50 g of water and 10 g of ethylene diamine were added into the first intermediate product, stirred for mixing homogeneously, heated to 180° C. and reacted for 2 h, to provide a second intermediate product; 20 g of acrylamide and 10 g of 2-acrylamide-2-methylpropane sulfonic acid were added into the second intermediate product, stirred for complete dissolution, pH was adjusted to 8, 0.3 g of an initiator of ammonium sulfate was added, and reacted at 40° C. for 4 h, to provide a crude product of substituted glucoside component.

The crude product of substituted glucoside component above was washed and suction filtered with 30 parts of acetic acid, further washed and suction filtered with 40 parts of acetone, finally washed and suction filtered with 500 parts of water, and then dried and crushed, to provide a substituted glucoside component. The product from example 9 had an amine value of 0.32 mmol/g.

Figure 3:
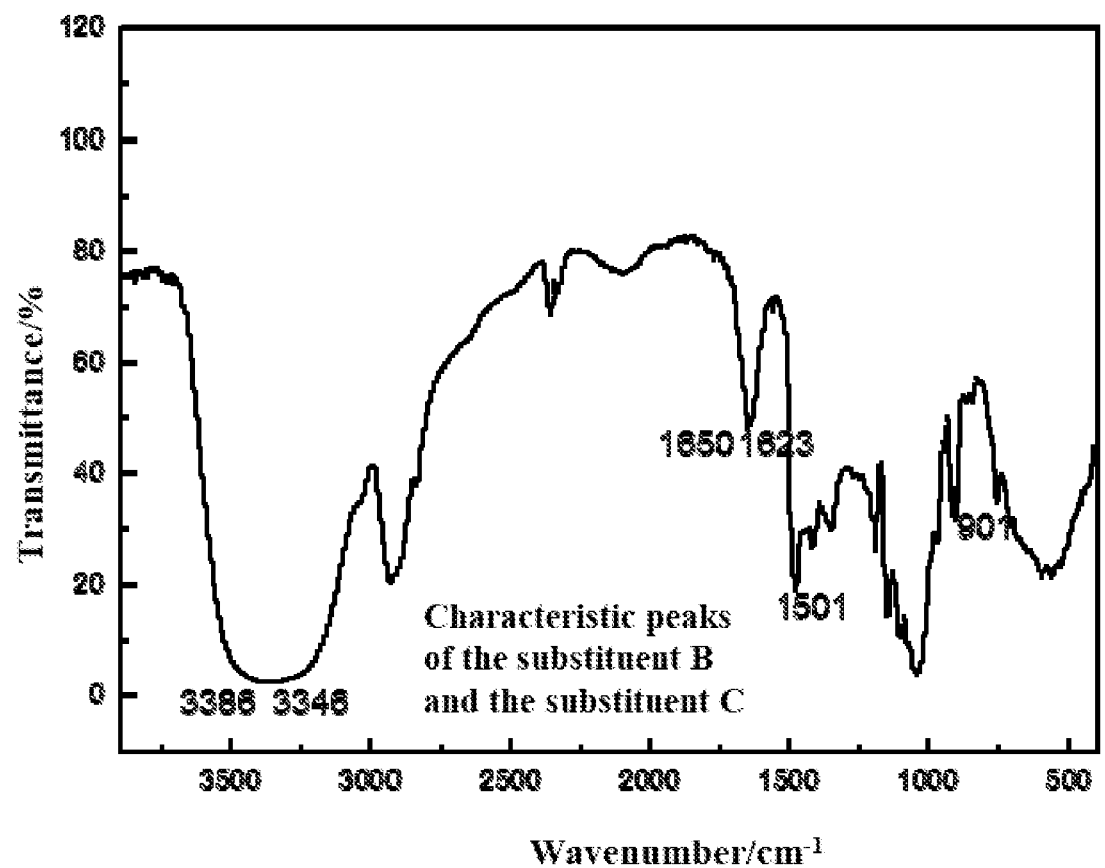
FIG. 3 is an infrared spectrum of the substituted glycoside component obtained in example 9 of the present invention.

The substituted glucoside component produced by example 9 was subjected to an infrared detection, providing a detection result as showed in FIG. 3, which showed characteristic peaks at 1501, 1650 and 3386 cm$^{-1}$, confirming the presence of the substituent B, and showed characteristic peaks at 901, 1623, and 3346 cm$^{-1}$, confirming the presence of the substituent C. The substituted glucoside component produced by example 9 had a schematic structure showed by formula 9:

Formula 9

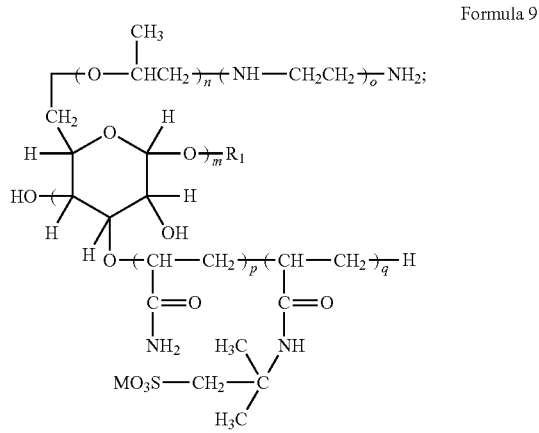

In formula 9, m is 1.4, $R_1$ is —$CH_3$, n is 1, o is 1, p is 18.2, and q is 14.6.

44

Example 10

50 g of ethylglycoside, 9 g of butylene oxide, 10 g of sulfuric chloride and 1.0 g of tartaric acid were added into an HTHP reactor, for which nitrogen was used to purge air, and nitrogen was used to increase the pressure to 2.0 MPa, stirred, and the temperature was increased to 50° C. and reacted for 1 h, to provide a first intermediate product; 60 g of water and 11 g of diethylenetriamine were added into the first intermediate product, stirred for mixing homogeneously, heated to 190° C. and reacted for 3 h, to provide a second intermediate product; 24 g of acrylamide and 12 g of 2-acrylamide-2-methylpropane sulfonic acid were added into the second intermediate product, stirred for complete dissolution, pH was adjusted to 9, 0.4 g of an initiator of potassium permanganate was added, and reacted at 50° C. for 5 h, to provide a crude product of substituted glucoside component.

The crude product of substituted glucoside component above was washed and suction filtered with 40 g of acetic acid; further washed and suction filtered with 50 g of acetone; finally washed and suction filtered with 600 g of water; and then dried and crushed, to provide a substituted glucoside component. The product from example 10 had an amine value of 0.66 mmol/g.

The substituted glucoside component produced by example 10 was subjected to an infrared detection, providing a detection result showing characteristic peaks at 1502, 1651 and 3387 cm$^{-1}$, confirming the presence of the substituent B, and showing characteristic peaks at 902, 1624 and 3344 cm$^{-1}$, confirming the presence of the substituent C. The substituted glucoside component produced by example 10 had a schematic structure showed by formula 10:

Formula 10

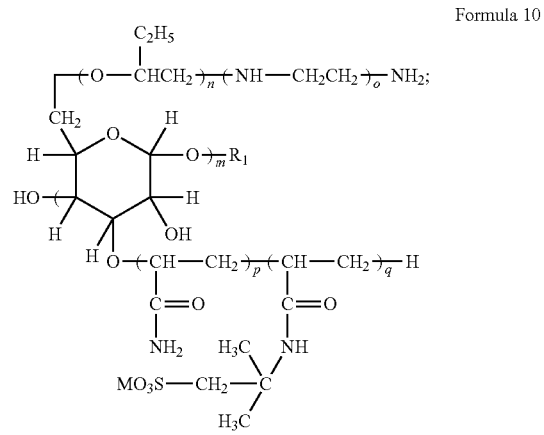

In formula 10, m is 1.4, $R_1$ is —$C_2H_5$, n is 1, o is 2, p is 17.8, and q is 14.4.

Example 11

60 g of propyl glucoside, 10 g of pentylene oxide, 11 g of phosphorus trichloride and 1.1 g of oxalic acid were added into an HTHP reactor, for which nitrogen was used to purge air, and nitrogen was used to increase the pressure to 3.0 MPa, stirred, and the temperature was increased to 60° C. and reacted for 2 h, to provide a first intermediate product;

70 g of water and 12 g of triethylene tetramine were added into the first intermediate product, stirred for mixing homogeneously, heated to 200° C. and reacted for 4 h, to provide a second intermediate product; 28 g of acrylamide and 14 g of 2-acrylamide-2-methylpropane sulfonic acid were added into the second intermediate product, stirred for complete dissolution, pH was adjusted to 10, 0.5 g of an initiator of ammonium ceric nitrate was added, and reacted at 60° C. for 6 h, to provide a crude product of substituted glucoside component.

The crude product of substituted glucoside component above was washed and suction filtered with 50 g of acetic acid; further washed and suction filtered with 60 g of acetone; finally washed and suction filtered with 700 g of water; and then dried and crushed, to provide a substituted glucoside component. The product from example 11 had an amine value of 0.79 mmol/g.

The substituted glucoside component produced by example 11 was subjected to an infrared detection, providing a detection result showing characteristic peaks at 1505, 1653 and 3382 cm$^{-1}$, confirming the presence of the substituent B, and showing characteristic peaks at 903, 1626 and 3345 cm$^{-1}$, confirming the presence of the substituent C. The substituted glucoside component produced by example 11 had a schematic structure showed by formula 11:

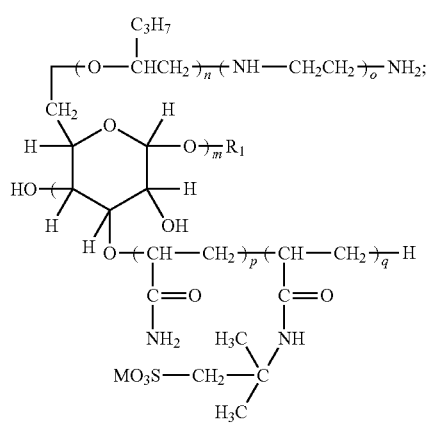

Formula 11

In formula 11, m is 1.4, $R_1$ is —$C_3H_7$, n is 1, o is 3, p is 18.3, and q is 14.7.

Example 12

70 g of butyl glycoside, 11 g of propylene oxide, 11 g of phosphorus pentachloride and 1.2 g of p-toluenesulfonic acid were added into an HTHP reactor, for which nitrogen was used to purge air, and nitrogen was used to increase the pressure to 4.0 MPa, stirred, and the temperature was increased to 70° C. and reacted for 3 h, to provide a first intermediate product; 80 g of water and 12 g of tetraethylene pentamine were added into the first intermediate product, stirred for mixing homogeneously, heated to 220° C. and reacted for 4 h, to provide a second intermediate product; 32 g of acrylamide and 16 g of 2-acrylamide-2-methylpropane sulfonic acid were added into the second intermediate product, stirred for complete dissolution, pH was adjusted to 10, 0.6 g of an initiator of tert-butyl hydroperoxide was added, and reacted at 60° C. for 6 h, to provide a crude product of substituted glucoside component.

The crude product of substituted glucoside component above was washed and suction filtered with 60 g of acetic acid; further washed and suction filtered with 70 g of acetone; finally washed and suction filtered with 800 g of water; and then dried and crushed, to provide a substituted glucoside component. The product from example 12 had an amine value of 1.05 mmol/g.

The substituted glucoside component produced by example 12 was subjected to an infrared detection, providing a detection result showing characteristic peaks at 1507, 1658 and 3389 cm$^{-1}$, confirming the presence of the substituent B, and showing characteristic peaks at 905, 1625 and 3347 cm$^{-1}$, confirming the presence of the substituent C. The substituted glucoside component produced by example 12 had a schematic structure showed by formula 12:

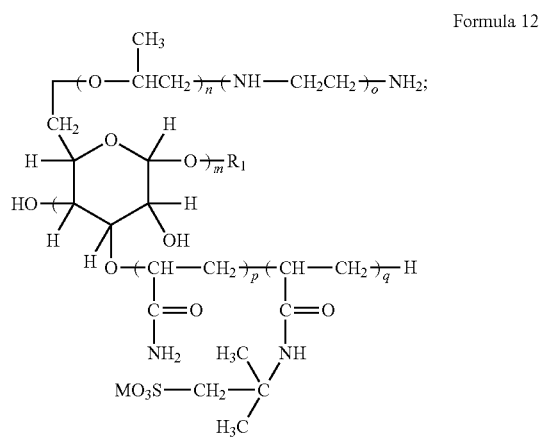

Formula 12

In formula 12, m is 1.4, $R_1$ is —$C_4H_9$, n is 1, o is 4, p is 17.9, and q is 14.1.

Example 13

70 g of methylglycoside, 37 g of propylene oxide, 65 g of distilled water and 2.3 g of p-toluenesulfonic acid were added into an HTHP reactor, and reacted for 1.0 h under normal pressure at 80° C., to provide a solution of chlorohydrin glucoside; 71 g of an aqueous solution of trimethylamine at a concentration of 33.3% was added into the chlorohydrin glucoside solution, and reacted for 2 h at 60° C., to provide an intermediate product; 50 g of acrylamide, 20 g of 2-acrylamide-2-methylpropane sulfonic acid and 10 g of vinyl triethoxysilane were added into the intermediate product, stirred for complete dissolution, pH was adjusted to 8, 0.3 g of an initiator of ammonium sulfate was added, and reacted at 50° C. for 2 h, to provide a crude product of substituted glucoside component.

The crude product of substituted glucoside component above was washed and suction filtered with 40 parts of acetic acid, further washed and suction filtered with 50 parts of acetone, finally washed and suction filtered with 800 parts of water, and then dried and crushed, to provide a substituted glucoside component. The cationicity of the product of example 13 was 0.24 mmol/g.

Figure 4:
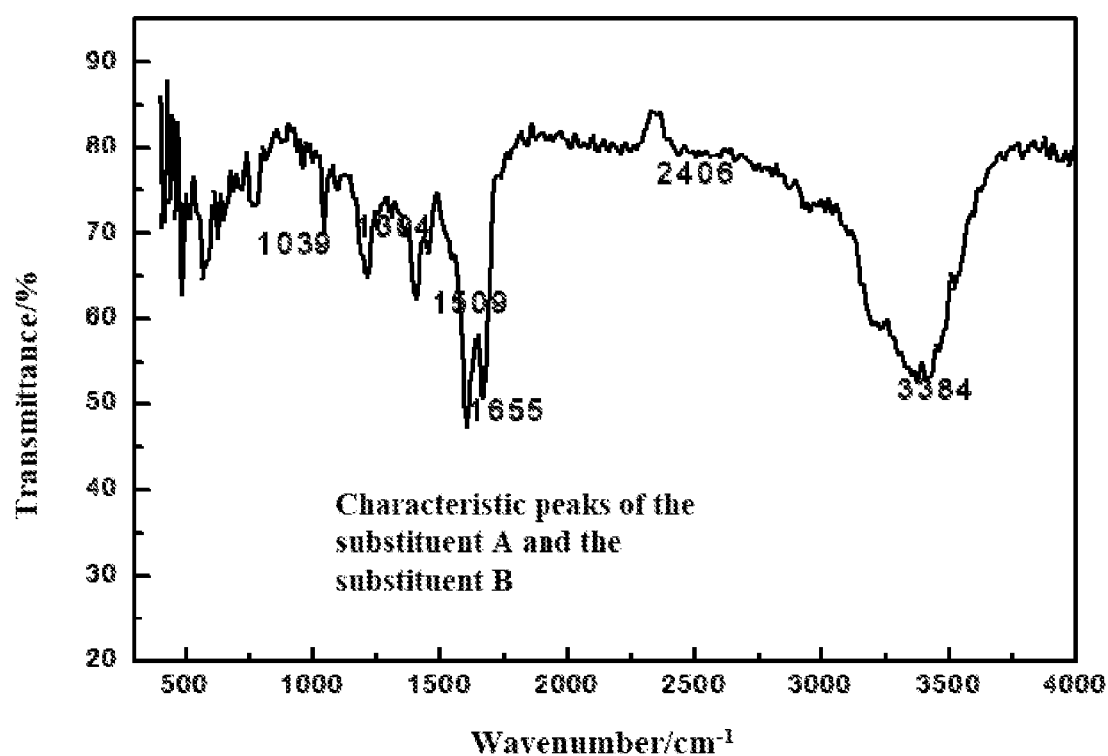
FIG. 4 is an infrared spectrum of the substituted glycoside component obtained in example 13 of the present invention.

The substituted glucoside component produced by example 13 was subjected to an infrared detection, providing a detection result as showed in FIG. 4, which showed characteristic peaks at 1039, 1304 and 2406 cm$^{-1}$, confirming the presence of the substituent A, and showed characteristic peaks at 1509, 1655, and 3384 cm$^{-1}$, confirming the presence of the substituent B. The substituted glucoside component produced by example 13 had a schematic structure showed by formula 13:

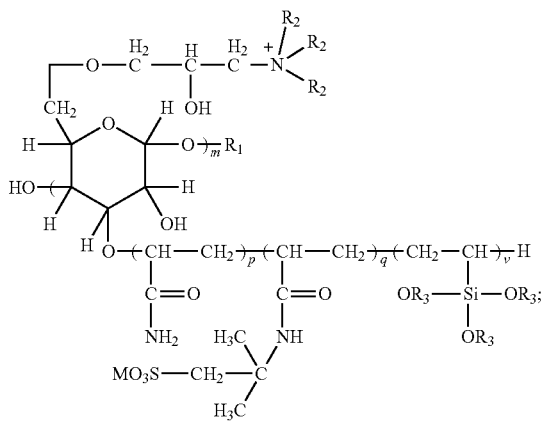

Formula 13

In formula 13, $R_1$ is —$CH_3$, $R_2$ is —$CH_3$, $R_3$ is $C_2H_5$, m is 1.4, p is 18.1, q is 14.2, and v is 9.5.

Example 14

80 g of ethylglycoside, 40 g of propylene oxide, 80 g of distilled water and 3.0 g of p-toluenesulfonic acid were added into an HTHP reactor, and reacted for 1.0 h under normal pressure at 70° C., to provide a solution of chlorohydrin glucoside; 90 g of an aqueous solution of trimethylamine at a concentration of 33.3% was added into the chlorohydrin glucoside solution, and reacted for 2 h at 70° C., to provide an intermediate product; 54 g of acrylamide, 27 g of 2-acrylamide-2-methylpropane sulfonic acid and 14 g of vinyl triethoxysilane were added into the intermediate product, stirred for complete dissolution, pH was adjusted to 9, 0.4 g of an initiator of potassium permanganate was added, and reacted at 50° C. for 5 h, to provide a crude product of substituted glucoside component.

The crude product of substituted glucoside component above was washed and suction filtered with 40 parts of acetic acid, further washed and suction filtered with 50 parts of acetone, finally washed and suction filtered with 600 parts of water, and then dried and crushed, to provide a substituted glucoside component. The cationicity of the product of example 14 was 0.39 mmol/g.

The substituted glucoside component produced by example 14 was subjected to an infrared detection, providing a detection result showing characteristic peaks at 1036, 1305 and 2405 cm$^{-1}$, confirming the presence of the substituent A, and showing characteristic peaks at 1504, 1657, and 3385 cm$^{-1}$, confirming the presence of the substituent B. The substituted glucoside component produced by example 14 had a schematic structure showed by formula 14:

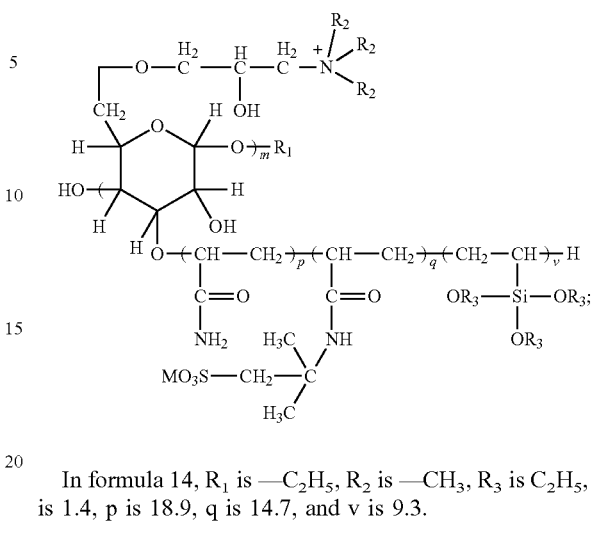

Formula 14

In formula 14, $R_1$ is —$C_2H_5$, $R_2$ is —$CH_3$, $R_3$ is $C_2H_5$, m is 1.4, p is 18.9, q is 14.7, and v is 9.3.

Example 15

0.2 mol of epichlorohydrin, 2.4 moL of distilled water and 0.004 mol of p-toluenesulfonic acid were added into a high-pressure reactor equipped with a thermometer, a condenser pipe and a stirrer, and reacted for 3 h under normal pressure at 100° C., to provide an aqueous solution of 3-chloro-1,2-propanediol;

the aqueous solution of 3-chloro-1,2-propanediol was cooled to room temperature, 0.4 mol of methylglycoside was added thereto, and reacted for 3 h under normal pressure at 100° C., into which 0.1 mol of propylene oxide was further added, to provide a solution of chlorohydrin glucoside;

the solution of chlorohydrin glucoside was neutralized with a saturated aqueous solution of sodium hydroxide to pH 7, then 0.4 mol of an aqueous solution of trimethylamine at a concentration of 33.3% was added to the bottom of the chlorohydrin glucoside solution, the addition being controlled to be accomplished within h, and reacted at 40° C. for 3 h, to provide a substituted glucoside component; with a yield of product of 95.28%. The cationicity of the product of example 15 was 0.44 mmol/g.

The substituted glucoside component produced by example 15 was subjected to an infrared detection, providing a detection result showing characteristic peaks at 1036, 1301, and 2401 cm$^{-1}$, confirming the presence of the substituent A. The substituted glucoside component produced by example 15 had a schematic structure showed by formula 15:

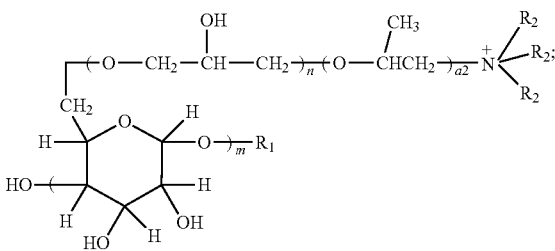

Formula 15

In formula 15, $R_1$ is —$CH_3$, $R_2$ is —$CH_3$, m is 1.4, n is 2, and a2 is 1.

Example 16

0.2 mol of epichlorohydrin, 3.2 mol of distilled water and 0.014 mol of p-sulfamic acid were added into a high-pressure reactor equipped with a thermometer, a condenser pipe and a stirrer, and reacted for 6 h under normal pressure at 100° C., to provide an aqueous solution of 3-chloro-1,2-propanediol;

the aqueous solution of 3-chloro-1,2-propanediol was cooled to room temperature, 0.22 mol of ethylglycoside was added thereto, and reacted for 3 h under normal pressure at 100° C., to provide a solution of chlorohydrin glucoside;

the solution of chlorohydrin glucoside was neutralized with a saturated aqueous solution of potassium hydroxide to pH 7, then 0.2 mol of an aqueous solution of trimethylamine was added to the bottom of the chlorohydrin glucoside solution, the addition being controlled to be accomplished within 1 h, and reacted at 60° C. for 7 h, to provide a substituted glucoside component; with a yield of product of 93.57%. The cationicity of the product of example 15 was 1.12 mmol/g.

The substituted glucoside component produced by example 16 was subjected to an infrared detection, providing a detection result showing characteristic peaks at 1036, 1304 and 2405 cm$^{-1}$, confirming the presence of the substituent A. The substituted glucoside component produced by example 16 had a schematic structure showed by formula 16:

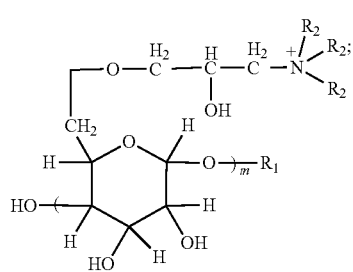

Formula 16

In formula 16, $R_1$ is —$C_2H_5$, $R_2$ is —$CH_3$, and m is 3.

Example 17

44.05 g of ethylene oxide, 37 g of epichlorohydrin, 97 g of methylglycoside, 72 g of distilled water and 1.72 g of p-toluenesulfonic acid were added into a high-pressure reactor equipped with a thermometer, a condenser pipe and a stirrer, and reacted for 0.5 h under normal 3 MPa at 50° C., to provide an intermediate product;

the intermediate product was neutralized with a neutralizer of NaOH to pH6, 24 g of ethylene diamine was added, and reacted for 3 h at a temperature of 40° C. under normal pressure. The reaction product obtained was removed with water to provide a substituted glucoside component. The product from example 17 had an amine value of 1.24 mmol/g.

The substituted glucoside component produced by example 17 was subjected to an infrared detection, providing a detection result showing characteristic peaks at 902, 1624 and 3351 cm$^{-1}$, confirming the presence of the substituent C. The substituted glucoside component produced by example 17 had a schematic structure showed by formula 17:

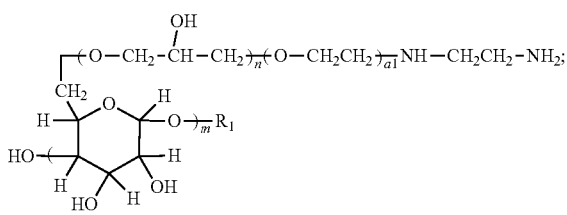

Formula 17

In formula 17, m is 1.4, $R_1$ is —$CH_3$, n is 1, and a1 is 1.

Example 18

44.05 g of ethylene oxide, 58.08 g of propylene oxide, 104 g of ethylglycoside, 90 g of distilled water and 1.96 g of sulfuric acid were added into a high-pressure reactor equipped with a thermometer, a condenser pipe and a stirrer, and reacted for 1 h under 5 MPa at 90° C., to provide an intermediate product;

the intermediate product was neutralized with a neutralizer of NaOH to pH6, 51.59 g of diethylenetriamine was added, and reacted for 4 h at a temperature of 80° C. under normal pressure. The reaction product obtained was removed with water to provide a substituted glucoside component. The product from example 18 had an amine value of 1.85 mmol/g.

The substituted glucoside component produced by example 18 was subjected to an infrared detection, providing a detection result showing characteristic peaks at 903, 1624 and 3351 cm$^{-1}$, confirming the presence of the substituent C. The substituted glucoside component produced by example 18 had a schematic structure showed by formula 18:

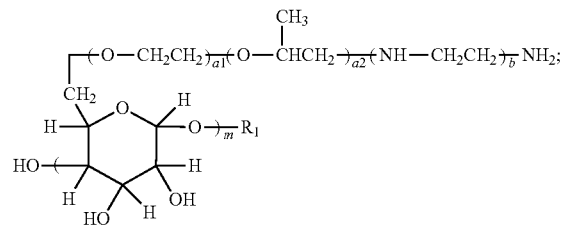

Formula 18

In formula 18, m is 3, $R_1$ is —$C_2H_5$, a1 is 1, a2 is 2, and b is 2.

Example 19

40 g of methylglycoside, 18 g of epichlorohydrin, 8 g of propylene oxide, 9 g of thionyl chloride and 0.8 g of hydrofluoric acid were added into an HTHP reactor, for which nitrogen was used to purge air, and nitrogen was used to increase the pressure to 2.0 MPa, stirred, and the temperature was increased to 50° C. and reacted for 1 h, to provide a first intermediate product; 50 g of water and 10 g of ethylene diamine were added into the first intermediate product, stirred for mixing homogeneously, heated to 190° C. and reacted for 3 h, to provide a second intermediate product; 20 g of acrylamide and 10 g of vinyl triethoxysilane were added into the second intermediate product, stirred for complete dissolution, pH was adjusted to 8, 0.3 g of an initiator of ammonium sulfate was added, and reacted at 50° C. for 5 h, to provide a crude product of substituted glucoside component.

The crude product of substituted glucoside component above was washed and suction filtered with 30 parts of acetic acid, further washed and suction filtered with 40 parts of acetone, finally washed and suction filtered with 500 parts of water, and then dried and crushed, to provide a substituted glucoside component. The product from example 19 had an amine value of 0.35 mmol/g.

The substituted glucoside component produced by example 19 was subjected to an infrared detection, providing a detection result showing characteristic peaks at 1502, 1651 and 3384 cm$^{-1}$, confirming the presence of the substituent B, and showing characteristic peaks at 902, 1624 and 3345 cm$^{-1}$, confirming the presence of the substituent C. The substituted glucoside component produced by example 19 had a schematic structure showed by formula 19:

pressure to 2.0 MPa, stirred, and the temperature was increased to 60° C. and reacted for 1 h, to provide a first intermediate product; 60 g of water and 11 g of diethylenetriamine were added into the first intermediate product, stirred for mixing homogeneously, heated to 190° C. and reacted for 3 h, to provide a second intermediate product; 24 g of acrylamide, 12 g of 2-acrylamide-2-methylpropane sulfonic acid and 20 g of vinyl triethoxysilane were added into the intermediate product, stirred for complete dissolution, pH was adjusted to 9, 0.4 g of an initiator of potassium permanganate was added, and reacted at 50° C. for 5 h, to provide a crude product of substituted glucoside component.

The crude product of substituted glucoside component above was washed and suction filtered with 40 g of acetic acid; further washed and suction filtered with 50 g of acetone; finally washed and suction filtered with 600 g of

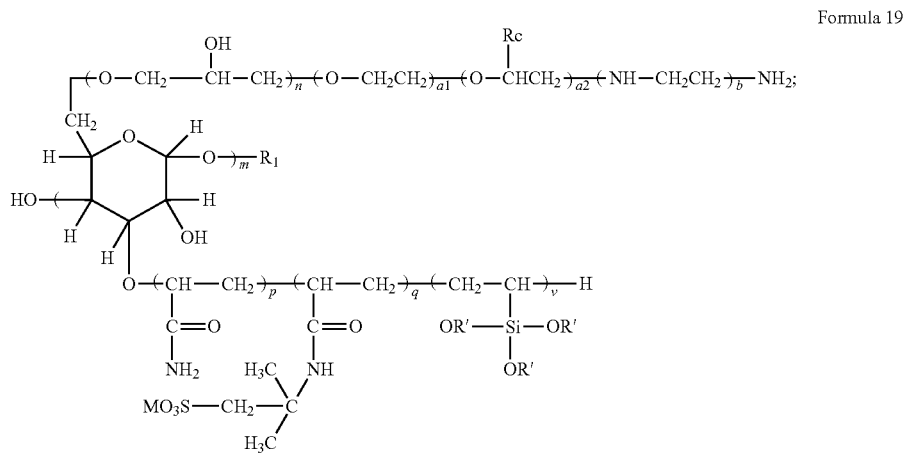

Formula 19

In formula 19, m is 1.4, $R_1$ is —CH$_3$, Rc is —CH$_3$, R' is —C$_2$H$_5$, n is 1, a1 is 0, a2 is 1, b is 1, p is 18, q is 0, and v is 6.

Example 20

50 g of ethylglycoside, 18 g of epichlorohydrin, 9 g of butylene oxide, 10 g of sulfuric chloride and 1.0 g of tartaric acid were added into an HTHP reactor, for which nitrogen was used to purge air, and nitrogen was used to increase the water; and then dried and crushed, to provide a substituted glucoside component. The product from example 20 had an amine value of 0.69 mmol/g.

The substituted glucoside component produced by example 20 was subjected to an infrared detection, providing a detection result showing characteristic peaks at 1503, 1652 and 3384 cm$^{-1}$, confirming the presence of the substituent B, and showing characteristic peaks at 901, 1626 and 3345 cm$^{-1}$, confirming the presence of the substituent C. The substituted glucoside component produced by example 20 had a schematic structure showed by formula 20:

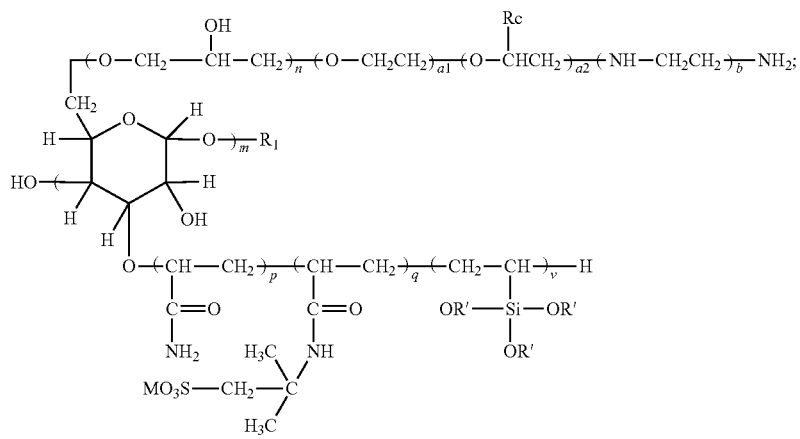

Formula 20

In formula 20, m is 3, $R_1$ is —$C_2H_5$, Rc is —$C_2H_5$, R' is —$C_2H_5$, n is 1, a1 is 0, a2 is 1, b is 2, p is 17, q is 14, and v is 12.

Example 21

40 g of methylglycoside, 8 g of propylene oxide, 9 g of thionyl chloride and 0.8 g of hydrofluoric acid were added into an HTHP reactor, for which nitrogen was used to purge air, and nitrogen was used to increase the pressure to 2.0 MPa, stirred, and the temperature was increased to 50° C. and reacted for 1 h, to provide a first intermediate product; 50 g of water and 10 g of ethylene diamine were added into the first intermediate product, stirred for mixing homogeneously, heated to 190° C. and reacted for 3 h, to provide a second intermediate product; 20 g of acrylamide was added into the second intermediate product, stirred for complete dissolution, pH was adjusted to 8, 0.3 g of an initiator of ammonium sulfate was added, and reacted at 50° C. for 5 h, to provide a crude product of substituted glucoside component.

The crude product of substituted glucoside component above was washed and suction filtered with 30 parts of acetic acid, further washed and suction filtered with 40 parts of acetone, finally washed and suction filtered with 500 parts of water, and then dried and crushed, to provide a substituted glucoside component. The product from example 21 had an amine value of 0.37 mmol/g.

The substituted glucoside component produced by example 21 was subjected to an infrared detection, providing a detection result showing characteristic peaks at 1501, 1650 and 3385 cm$^1$, confirming the presence of the substituent B, and showing characteristic peaks at 901, 1625 and 3346 cm$^{-1}$, confirming the presence of the substituent C. The substituted glucoside component produced by example 21 had a schematic structure showed by formula 21:

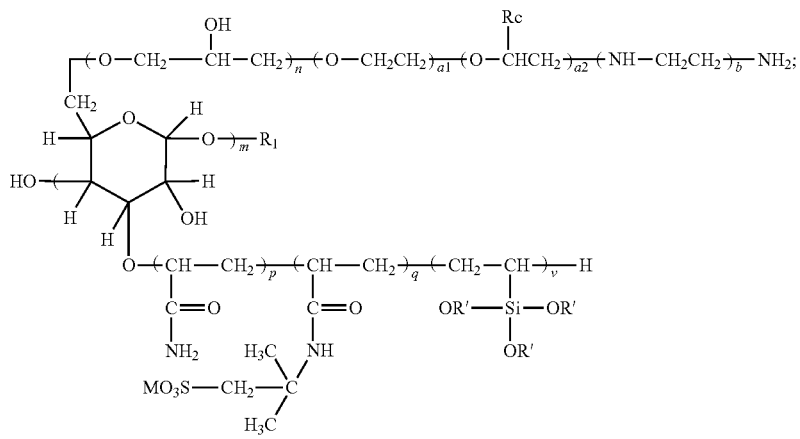

Formula 21

In formula 21, m is 1.4, $R_1$ is —$CH_3$, Rc is —$CH_3$, R' is —$C_2H_5$, n is 0, a1 is 0, a2 is 1, b is 1, and p is 18.

Example 22

70 g of methylglycoside, 37 g of propylene oxide, 65 g of distilled water and 2.3 g of p-toluenesulfonic acid were added into an HTHP reactor, and reacted for 1.0 h under normal pressure at 90° C., to provide a solution of chlorohydrin glucoside; 75 g of an aqueous solution of trimethylamine at a concentration of 33.3% was added into the chlorohydrin glucoside solution, and reacted for 2 h at 60° C., to provide an intermediate product; 55 g of acrylamide was added into the intermediate product, stirred for complete dissolution, pH was adjusted to 8, 0.3 g of an initiator of ammonium sulfate was added, and reacted at 50° C. for 2 h, to provide a crude product of substituted glucoside component.

The crude product of substituted glucoside component above was washed and suction filtered with 40 parts of acetic acid, further washed and suction filtered with 50 parts of acetone, finally washed and suction filtered with 800 parts of water, and then dried and crushed, to provide a substituted glucoside component. The cationicity of the product of example 22 was 0.30 mmol/g.

The substituted glucoside component produced by example 22 was subjected to an infrared detection, providing a detection result showing characteristic peaks at 1038, 1304 and 2405 cm$^{-1}$, confirming the presence of the substituent A, and showing characteristic peaks at 1508, 1654, and 3385 cm$^{-1}$, confirming the presence of the substituent B. The substituted glucoside component produced by example 22 had a schematic structure showed by formula 22:

Formula 22

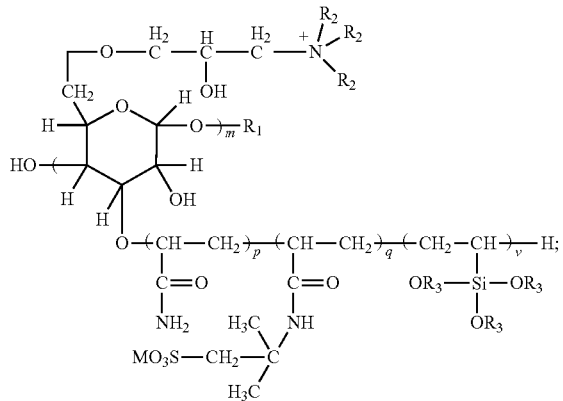

In formula 22, $R_1$ is —$CH_3$, $R_2$ is —$CH_3$, $R_3$ is $C_2H_5$, m is 1.4, p is 19, q is 0, and v is 0.

Example 23

80 g of ethylglycoside, 40 g of propylene oxide, 80 g of distilled water and 3.0 g of p-toluenesulfonic acid were added into an HTHP reactor, and reacted for 1.0 h under normal pressure at 90° C., to provide a solution of chlorohydrin glucoside; 90 g of an aqueous solution of trimethylamine at a concentration of 33.3% was added into the chlorohydrin glucoside solution, and reacted for 2 h at 70° C., to provide an intermediate product; 54 g of acrylamide and 12 g of 2-acrylamide-2-methylpropane sulfonic acid were added into the intermediate product, stirred for complete dissolution, pH was adjusted to 9, 0.4 g of an initiator of potassium permanganate was added, and reacted at 50° C. for 5 h, to provide a crude product of substituted glucoside component.

The crude product of substituted glucoside component above was washed and suction filtered with 40 parts of acetic acid, further washed and suction filtered with 50 parts of acetone, finally washed and suction filtered with 600 parts of water, and then dried and crushed, to provide a substituted glucoside component. The cationicity of the product of example 23 was 0.45 mmol/g.

The substituted glucoside component produced by example 23 was subjected to an infrared detection, providing a detection result showing characteristic peaks at 1035, 1304 and 2404 cm$^{-1}$, confirming the presence of the substituent A, and showing characteristic peaks at 1502, 1658, and 3386 cm$^{-1}$, confirming the presence of the substituent B. The substituted glucoside component produced by example 23 had a schematic structure showed by formula 23:

Formula 23

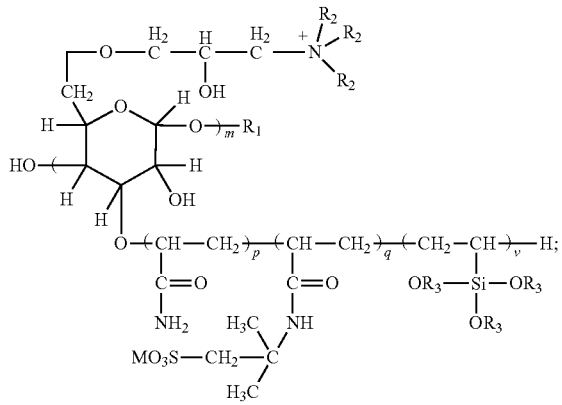

In formula 23, $R_1$ is —$C_2H_5$, $R_2$ is —$CH_3$, $R_3$ is $C_2H_5$, m is 1.4, p is 18, q is 6, and v is 0.

Example 24

160 g of the substituted glucoside component produced in example 1, 240 g of the substituted glucoside component produced in example 5, and 80 g of the substituted glucoside component produced in example 9 were mixed, to provide a mixture. The mixture had a cationicity of 0.13 mmol/g, and an amine value of 0.65 mmol/g.

Then, the mixture was mixed with 320 g of water, so as to formulate a drilling fluid base fluid at a weight fraction of 60%;

0.4 g of xanthan gum XC, 0.4 g of high-viscosity polyanionic cellulose sodium salt HV-PAC, 0.4 g of high-viscosity carboxymethylcellulose sodium salt HV-CMC, 0.8 g of polyacrylamide potassium salt KPAM, 4.0 g of sodium bentonite and 3.2 g of low-viscosity carboxymethylcellulose sodium salt LV-CMC were added into 400 mL of the drilling fluid base fluid stated above, and stirred at a high speed of 5000 r/min for 20 min. 8.0 g of sulfonated phenolic resin, 8.0 g of calcium carbonate, 40 g of sodium chloride and 8.0 g of sodium hydroxide were added, and stirred at a high speed of 5000 r/min for 20 min. The mixture obtained was placed into an aging tank, and rolled for 16 h at 190° C., to provide a drilling fluid composition.

Example 25

200 g of the substituted glucoside component produced in example 2, 280 g of the substituted glucoside component produced in example 6, and 120 g of the substituted glucoside component produced in example 10 were mixed, to provide a mixture. The mixture had a cationicity of 0.37 mmol/g, and an amine value of 0.95 mmol/g.

Then, the mixture was mixed with 200 g of water, so as to formulate a drilling fluid base fluid at a weight fraction of 75%;

0.8 g of xanthan gum XC, 0.8 g of high-viscosity polyanionic cellulose sodium salt HV-PAC, 0.8 g of high-viscosity carboxymethylcellulose sodium salt HV-CMC, 1.6 g of polyacrylamide potassium salt KPAM, 8.0 g of dextrin and 4.0 g of low-viscosity carboxymethylcellulose sodium salt LV-CMC were added into 400 mL of the drilling fluid base fluid stated above, and stirred at a high speed of 7000 r/min for 20 min. 12 g of sulfonated lignite, 12 g of an oil-soluble resin, 60 g of potassium chloride and 12 g of potassium hydroxide were added, and stirred at a high speed of 7000 r/min for 20 min. The mixture obtained was placed into an aging tank, and rolled for 16 h at 190° C., to provide a drilling fluid composition.

Example 26

240 g of the substituted glucoside component produced in example 3, 300 g of the substituted glucoside component produced in example 7, and 160 g of the substituted glucoside component produced in example 11 were mixed, to provide a mixture. The mixture had a cationicity of 0.46 mmol/g, and an amine value of 1.02 mmol/g.

Then, the mixture was mixed with 100 g of water, so as to formulate a drilling fluid base fluid at a weight fraction of 87.5%;

1.6 g of xanthan gum XC, 1.6 g of high-viscosity polyanionic cellulose sodium salt HV-PAC, 1.6 g of high-viscosity carboxymethylcellulose sodium salt HV-CMC, 1.2 g of polyacrylamide potassium salt KPAM, 12 g of dextrin and 4.8 g of carboxymethyl starch sodium were added into 400 mL of the drilling fluid base fluid stated above, and stirred at a high speed of 8000 r/min for 20 min. 16 g of sulfonated lignite, 16 g of a non-permeable plugging agent, 80 g of calcium chloride and 16 g of sodium carbonate were added, and stirred at a high speed of 8000 r/min for 20 min. The mixture obtained was placed into an aging tank, and rolled for 16 h at 190° C., to provide a drilling fluid composition.

Example 27

240 g of the substituted glucoside component produced in example 4, 320 g of the substituted glucoside component produced in example 8, and 200 g of the substituted glucoside component produced in example 12 were mixed, to provide a mixture. The mixture had a cationicity of 0.54 mmol/g, and an amine value of 1.37 mmol/g.

Then, the mixture was mixed with 40 g of water, so as to formulate a drilling fluid base fluid at a weight fraction of 95%;

1.6 g of xanthan gum XC, 1.6 g of high-viscosity polyanionic cellulose sodium salt HV-PAC, 1.6 g of high-viscosity carboxymethylcellulose sodium salt HV-CMC, 1.2 g of polyacrylamide potassium salt KPAM, 12 g of dextrin and 4.8 g of carboxymethyl starch sodium were added into 400 mL of the drilling fluid base fluid stated above, and stirred at a high speed of 10000 r/min for 20 min. 16 g of sulfonated lignite, 16 g of sulfonated asphalt, 96 g of potassium formate and 16 g of potassium carbonate were added, and stirred at a high speed of 10000 r/min for 20 min. The mixture obtained was placed into an aging tank, and rolled for 16 h at 190° C., to provide a drilling fluid composition.

Example 28

320 g of the substituted glucoside component produced in example 5 and 200 g of the substituted glucoside component produced in example 13 were mixed, to provide a mixture. The mixture had a cationicity of 0.09 mmol/g, and an amine value of 0.74 mmol/g.

Then, the mixture was mixed with 280 g of water, so as to formulate a drilling fluid base fluid at a weight fraction of 65%;

0.8 g of xanthan gum XC, 0.8 g of high-viscosity polyanionic cellulose sodium salt HV-PAC, 0.8 g of high-viscosity carboxymethylcellulose sodium salt HV-CMC, 0.8 g of polyacrylamide potassium salt KPAM, 4.0 g of sodium bentonite and 3.2 g of low-viscosity carboxymethylcellulose sodium salt LV-CMC were added into 400 mL of the drilling fluid base fluid stated above, and stirred at a high speed of 10000 r/min for 20 min. 8.0 g of sulfonated phenolic resin, 8.0 g of calcium carbonate, 40 g of sodium chloride and 8.0 g of sodium hydroxide were added, and stirred at a high speed of 10000 r/min for 20 min. The mixture obtained was placed into an aging tank, and rolled for 16 h at 190° C., to provide a drilling fluid composition.

Example 29

320 g of the substituted glucoside component produced in example 6 and 160 g of the substituted glucoside component produced in example 14 were mixed, to provide a mixture. The mixture had a cationicity of 0.13 mmol/g, and an amine value of 1.17 mmol/g.

Then, the mixture was mixed with 320 g of water, so as to formulate a drilling fluid base fluid at a weight fraction of 60%;

1.4 g of xanthan gum XC, 1.4 g of high-viscosity polyanionic cellulose sodium salt HV-PAC, 1.4 g of high-viscosity carboxymethylcellulose sodium salt HV-CMC, 1.0 g of polyacrylamide potassium salt KPAM, 10 g of dextrin and 4.2 g of carboxymethyl starch sodium were added into 400 mL of the drilling fluid base fluid stated above, and stirred at a high speed of 10000 r/min for 20 min. 16 g of sulfonated lignite, 16 g of a non-permeable plugging agent, 40 g of calcium chloride and 16 g of sodium carbonate were added, and stirred at a high speed of 10000 r/min for 20 min. The mixture obtained was placed into an aging tank, and rolled for 16 h at 190° C., to provide a drilling fluid composition.

Example 30

160 g of the substituted glucoside component produced in example 1, 240 g of the substituted glucoside component produced in example 5, 160 g of the substituted glucoside component produced in example 9, and 200 g of the substituted glucoside component produced in example 13 were mixed, to provide a mixture. The mixture had a cationicity of 0.15 mmol/g, and an amine value of 0.45 mmol/g.

Then, the mixture was mixed with 40 g of water, so as to formulate a drilling fluid base fluid at a weight fraction of 95%;

1.6 g of xanthan gum XC, 1.6 g of high-viscosity polyanionic cellulose sodium salt HV-PAC, 1.6 g of high-viscosity carboxymethylcellulose sodium salt HV-CMC, 1.2 g of polyacrylamide potassium salt KPAM, 12 g of dextrin and 4.8 g of carboxymethyl starch sodium were added into 400 mL of the drilling fluid base fluid stated above, and stirred at a high speed of 10000 r/min for 20 min. 16 g of sulfonated lignite, 16 g of a non-permeable plugging agent, 80 g of calcium chloride and 16 g of sodium carbonate were added, and stirred at a high speed of 10000 r/min for 20 min.

The mixture obtained was placed into an aging tank, and rolled for 16 h at 190° C., to provide a drilling fluid composition.

Example 31

160 g of the substituted glucoside component produced in example 15, 240 g of the substituted glucoside component produced in example 17, and 80 g of the substituted glucoside component produced in example 19 were mixed, to provide a mixture. The mixture had a cationicity of 0.09 mmol/g, and an amine value of 0.43 mmol/g.

Then, the mixture was mixed with 320 g of water, so as to formulate a drilling fluid base fluid at a weight fraction of 60%;

0.4 g of xanthan gum XC, 0.4 g of high-viscosity polyanionic cellulose sodium salt HV-PAC, 0.4 g of high-viscosity carboxymethylcellulose sodium salt HV-CMC, 0.8 g of polyacrylamide potassium salt KPAM, 4.0 g of sodium bentonite and 3.2 g of low-viscosity carboxymethylcellulose sodium salt LV-CMC were added into 400 mL of the drilling fluid base fluid stated above, and stirred at a high speed of 5000 r/min for 20 min. 8.0 g of sulfonated phenolic resin, 8.0 g of calcium carbonate, 40 g of sodium chloride and 8.0 g of sodium hydroxide were added, and stirred at a high speed of 5000 r/min for 20 min. The mixture obtained was placed into an aging tank, and rolled for 16 h at 190° C., to provide a drilling fluid composition.

Example 32

200 g of the substituted glucoside component produced in example 16, 280 g of the substituted glucoside component produced in example 18, and 120 g of the substituted glucoside component produced in example 20 were mixed, to provide a mixture. The mixture had a cationicity of 0.37 mmol/g, and an amine value of 1.00 mmol/g.

Then, the mixture was mixed with 200 g of water, so as to formulate a drilling fluid base fluid at a weight fraction of 75%;

0.8 g of xanthan gum XC, 0.8 g of high-viscosity polyanionic cellulose sodium salt HV-PAC, 0.8 g of high-viscosity carboxymethylcellulose sodium salt HV-CMC, 1.6 g of polyacrylamide potassium salt KPAM, 8.0 g of dextrin and 4.0 g of low-viscosity carboxymethylcellulose sodium salt LV-CMC were added into 400 mL of the drilling fluid base fluid stated above, and stirred at a high speed of 7000 r/min for 20 min. 12 g of sulfonated lignite, 12 g of an oil-soluble resin, 60 g of potassium chloride and 12 g of potassium hydroxide were added, and stirred at a high speed of 7000 r/min for 20 min. The mixture obtained was placed into an aging tank, and rolled for 16 h at 190° C., to provide a drilling fluid composition.

Example 33

240 g of the substituted glucoside component produced in example 16, 300 g of the substituted glucoside component produced in example 18, and 160 g of the substituted glucoside component produced in example 21 were mixed, to provide a mixture. The mixture had a cationicity of 0.38 mmol/g, and an amine value of 0.88 mmol/g.

Then, the mixture was mixed with 100 g of water, so as to formulate a drilling fluid base fluid at a weight fraction of 87.5%;

1.6 g of xanthan gum XC, 1.6 g of high-viscosity polyanionic cellulose sodium salt HV-PAC, 1.6 g of high-viscosity carboxymethylcellulose sodium salt HV-CMC, 1.2 g of polyacrylamide potassium salt KPAM, 12 g of dextrin and 4.8 g of carboxymethyl starch sodium were added into 400 mL of the drilling fluid base fluid stated above, and stirred at a high speed of 8000 r/min for 20 min. 16 g of sulfonated lignite, 16 g of a non-permeable plugging agent, 80 g of calcium chloride and 16 g of sodium carbonate were added, and stirred at a high speed of 8000 r/min for 20 min. The mixture obtained was placed into an aging tank, and rolled for 16 h at 190° C., to provide a drilling fluid composition.

Example 34

240 g of the substituted glucoside component produced in example 16, 320 g of the substituted glucoside component produced in example 17, and 200 g of the substituted glucoside component produced in example 21 were mixed, to provide a mixture. The mixture had a cationicity of 0.35 mmol/g, and an amine value of 0.62 mmol/g.

Then, the mixture was mixed with 40 g of water, so as to formulate a drilling fluid base fluid at a weight fraction of 95%;

1.6 g of xanthan gum XC, 1.6 g of high-viscosity polyanionic cellulose sodium salt HV-PAC, 1.6 g of high-viscosity carboxymethylcellulose sodium salt HV-CMC, 1.2 g of polyacrylamide potassium salt KPAM, 12 g of dextrin and 4.8 g of carboxymethyl starch sodium were added into 400 mL of the drilling fluid base fluid stated above, and stirred at a high speed of 10000 r/min for 20 min. 16 g of sulfonated lignite, 16 g of sulfonated asphalt, 96 g of potassium formate and 16 g of potassium carbonate were added, and stirred at a high speed of 10000 r/min for 20 min. The mixture obtained was placed into an aging tank, and rolled for 16 h at 190° C., to provide a drilling fluid composition.

Example 35

320 g of the substituted glucoside component produced in example 18 and 200 g of the substituted glucoside component produced in example 22 were mixed, to provide a mixture. The mixture had a cationicity of 0.12 mmol/g, and an amine value of 1.14 mmol/g.

Then, the mixture was mixed with 280 g of water, so as to formulate a drilling fluid base fluid at a weight fraction of 65%;

0.8 g of xanthan gum XC, 0.8 g of high-viscosity polyanionic cellulose sodium salt HV-PAC, 0.8 g of high-viscosity carboxymethylcellulose sodium salt HV-CMC, 0.8 g of polyacrylamide potassium salt KPAM, 4.0 g of sodium bentonite and 3.2 g of low-viscosity carboxymethylcellulose sodium salt LV-CMC were added into 400 mL of the drilling fluid base fluid stated above, and stirred at a high speed of 10000 r/min for 20 min. 8.0 g of sulfonated phenolic resin, 8.0 g of calcium carbonate, 40 g of sodium chloride and 8.0 g of sodium hydroxide were added, and stirred at a high speed of 10000 r/min for 20 min. The mixture obtained was placed into an aging tank, and rolled for 16 h at 190° C., to provide a drilling fluid composition.

Example 36

320 g of the substituted glucoside component produced in example 17 and 160 g of the substituted glucoside component produced in example 23 were mixed, to provide a mixture. The mixture had a cationicity of 0.15 mmol/g, and an amine value of 0.83 mmol/g.

Then, the mixture was mixed with 320 g of water, so as to formulate a drilling fluid base fluid at a weight fraction of 60%;

1.4 g of xanthan gum XC, 1.4 g of high-viscosity polyanionic cellulose sodium salt HV-PAC, 1.4 g of high-viscosity carboxymethylcellulose sodium salt HV-CMC, 1.0 g of polyacrylamide potassium salt KPAM, 10 g of dextrin and 4.2 g of carboxymethyl starch sodium were added into 400 mL of the drilling fluid base fluid stated above, and stirred at a high speed of 10000 r/min for 20 min. 16 g of sulfonated lignite, 16 g of a non-permeable plugging agent, 40 g of calcium chloride and 16 g of sodium carbonate were added, and stirred at a high speed of 10000 r/min for 20 min. The mixture obtained was placed into an aging tank, and rolled for 16 h at 190° C., to provide a drilling fluid composition.

Example 37

160 g of the substituted glucoside component produced in example 15, 240 g of the substituted glucoside component produced in example 17, 160 g of the substituted glucoside component produced in example 19, and 200 g of the substituted glucoside component produced in example 22 were mixed, to provide a mixture. The mixture had a cationicity of 0.17 mmol/g, and an amine value of 0.47 mmol/g.

Then, the mixture was mixed with 40 g of water, so as to formulate a drilling fluid base fluid at a weight fraction of 95%;

1.6 g of xanthan gum XC, 1.6 g of high-viscosity polyanionic cellulose sodium salt HV-PAC, 1.6 g of high-viscosity carboxymethylcellulose sodium salt HV-CMC, 1.2 g of polyacrylamide potassium salt KPAM, 1.2 g of dextrin and 4.8 g of carboxymethyl starch sodium were added into 400 mL of the drilling fluid base fluid stated above, and stirred at a high speed of 10000 r/min for 20 min. 16 g of sulfonated lignite, 16 g of a non-permeable plugging agent, 80 g of calcium chloride and 16 g of sodium carbonate were added, and stirred at a high speed of 10000 r/min for 20 min. The mixture obtained was placed into an aging tank, and rolled for 16 h at 190° C., to provide a drilling fluid composition.

Example 38

160 g of the substituted glucoside component produced in example 16, 240 g of the substituted glucoside component produced in example 18, 160 g of the substituted glucoside component produced in example 20, and 200 g of the substituted glucoside component produced in example 23 were mixed, to provide a mixture. The mixture had a cationicity of 0.35 mmol/g, and an amine value of 0.73 mmol/g.

Then, the mixture was mixed with 40 g of water, so as to formulate a drilling fluid base fluid at a weight fraction of 95%;

1.6 g of xanthan gum XC, 1.6 g of high-viscosity polyanionic cellulose sodium salt HV-PAC, 1.6 g of high-viscosity carboxymethylcellulose sodium salt HV-CMC, 1.2 g of polyacrylamide potassium salt KPAM, 12 g of dextrin and 4.8 g of carboxymethyl starch sodium were added into 400 mL of the drilling fluid base fluid stated above, and stirred at a high speed of 10000 r/min for 20 min. 16 g of sulfonated lignite, 16 g of a non-permeable plugging agent, 80 g of calcium chloride and 16 g of sodium carbonate were added, and stirred at a high speed of 10000 r/min for 20 min. The mixture obtained was placed into an aging tank, and rolled for 16 h at 190° C., to provide a drilling fluid composition.

Example 39

160 g of the substituted glucoside component produced in example 1, 320 g of the substituted glucoside component produced in example 5, and 200 g of the substituted glucoside component produced in example 9 were mixed, to provide a mixture. The mixture had a cationicity of 0.09 mmol/g, and an amine value of 0.66 mmol/g.

Then, the mixture was mixed with 120 g of water, so as to formulate a drilling fluid base fluid at a weight fraction of 85%;

0.4 g of xanthan gum XC, 0.4 g of high-viscosity polyanionic cellulose sodium salt HV-PAC, 0.4 g of high-viscosity carboxymethylcellulose sodium salt HV-CMC, 0.8 g of polyacrylamide potassium salt KPAM, 4.0 g of sodium bentonite and 3.2 g of low-viscosity carboxymethylcellulose sodium salt LV-CMC were added into 400 mL of the drilling fluid base fluid stated above, and stirred at a high speed of 5000 r/min for 20 min. 8.0 g of sulfonated phenolic resin, 8.0 g of calcium carbonate, 40 g of sodium chloride and 8.0 g of sodium hydroxide were added, and stirred at a high speed of 5000 r/min for 20 min. The mixture obtained was placed into an aging tank, and rolled for 16 h at 190° C., to provide a drilling fluid composition.

Example 40

240 g of the substituted glucoside component produced in example 2, 240 g of the substituted glucoside component produced in example 6, and 160 g of the substituted glucoside component produced in example 10 were mixed, to provide a mixture. The mixture had a cationicity of 0.41 mmol/g, and an amine value of 0.83 mmol/g.

Then, the mixture was mixed with 160 g of water, so as to formulate a drilling fluid base fluid at a weight fraction of 80%;

0.8 g of xanthan gum XC, 0.8 g of high-viscosity polyanionic cellulose sodium salt HV-PAC, 0.8 g of high-viscosity carboxymethylcellulose sodium salt HV-CMC, 1.6 g of polyacrylamide potassium salt KPAM, 8.0 g of dextrin and 4.0 g of low-viscosity carboxymethylcellulose sodium salt LV-CMC were added into 400 mL of the drilling fluid base fluid stated above, and stirred at a high speed of 7000 r/min for 20 min. 12 g of sulfonated lignite, 12 g of an oil-soluble resin, 60 g of potassium chloride and 12 g of potassium hydroxide were added, and stirred at a high speed of 7000 r/min for 20 min. The mixture obtained was placed into an aging tank, and rolled for 16 h at 190° C., to provide a drilling fluid composition.

Example 41

240 g of the substituted glucoside component produced in example 3, 280 g of the substituted glucoside component produced in example 7, and 200 g of the substituted glucoside component produced in example 11 were mixed, to provide a mixture. The mixture had a cationicity of 0.45 mmol/g, and an amine value of 0.98 mmol/g.

Then, the mixture was mixed with 80 g of water, so as to formulate a drilling fluid base fluid at a weight fraction of 90%;

1.6 g of xanthan gum XC, 1.6 g of high-viscosity polyanionic cellulose sodium salt HV-PAC, 1.6 g of high-viscosity carboxymethylcellulose sodium salt HV-CMC, 1.2 g of polyacrylamide potassium salt KPAM, 12 g of dextrin and 4.8 g of carboxymethyl starch sodium were added into 400 mL of the drilling fluid base fluid stated above, and stirred at a high speed of 8000 r/min for 20 min. 16 g of sulfonated lignite, 16 g of a non-permeable plugging agent, 80 g of calcium chloride and 16 g of sodium carbonate were added, and stirred at a high speed of 8000 r/min for 20 min. The mixture obtained was placed into an aging tank, and rolled for 16 h at 190° C., to provide a drilling fluid composition.

Example 42

240 g of the substituted glucoside component produced in example 4, 320 g of the substituted glucoside component produced in example 8, and 80 g of the substituted glucoside component produced in example 12 were mixed, to provide a mixture. The mixture had a cationicity of 0.57 mmol/g, and an amine value of 1.52 mmol/g.

Then, the mixture was mixed with 200 g of water, so as to formulate a drilling fluid base fluid at a weight fraction of 75%;

1.6 g of xanthan gum XC, 1.6 g of high-viscosity polyanionic cellulose sodium salt HV-PAC, 1.6 g of high-viscosity carboxymethylcellulose sodium salt HV-CMC, 1.2 g of polyacrylamide potassium salt KPAM, 12 g of dextrin and 4.8 g of carboxymethyl starch sodium were added into 400 mL of the drilling fluid base fluid stated above, and stirred at a high speed of 10000 r/min for 20 min. 16 g of sulfonated lignite, 16 g of sulfonated asphalt, 96 g of potassium formate and 16 g of potassium carbonate were added, and stirred at a high speed of 10000 r/min for 20 min. The mixture obtained was placed into an aging tank, and rolled for 16 h at 190° C., to provide a drilling fluid composition.

Example 43

160 g of the substituted glucoside component produced in example 3, 320 g of the substituted glucoside component produced in example 5, 80 g of the substituted glucoside component produced in example 10, and 200 g of the substituted glucoside component produced in example 14 were mixed, to provide a mixture. The mixture had a cationicity of 0.39 mmol/g, and an amine value of 0.57 mmol/g.

Then, the mixture was mixed with 40 g of water, so as to formulate a drilling fluid base fluid at a weight fraction of 95%;

1.6 g of xanthan gum XC, 1.6 g of high-viscosity polyanionic cellulose sodium salt HV-PAC, 1.6 g of high-viscosity carboxymethylcellulose sodium salt HV-CMC, 1.2 g of polyacrylamide potassium salt KPAM, 12 g of dextrin and 4.8 g of carboxymethyl starch sodium were added into 400 mL of the drilling fluid base fluid stated above, and stirred at a high speed of 10000 r/min for 20 min. 16 g of sulfonated lignite, 16 g of a non-permeable plugging agent, 80 g of calcium chloride and 16 g of sodium carbonate were added, and stirred at a high speed of 10000 r/min for 20 min. The mixture obtained was placed into an aging tank, and rolled for 16 h at 190° C., to provide a drilling fluid composition.

Comparative Example 1

760 g of the substituted glucoside component produced in example 4 was mixed with 40 g of water, to formulate an aqueous solution of the base fluid at a weight fraction of 95%;

1.6 g of xanthan gum XC, 1.6 g of high-viscosity polyanionic cellulose sodium salt HV-PAC, 1.6 g of high-viscosity carboxymethylcellulose sodium salt HV-CMC, 1.2 g of polyacrylamide potassium salt KPAM, 12 g of dextrin and 4.8 g of carboxymethyl starch sodium were added into 400 mL of the aqueous solution of the base fluid stated above, and stirred at a high speed of 10000 r/min for 20 min. 16 g of sulfonated lignite, 16 g of sulfonated asphalt, 96 g of potassium formate and 16 g of potassium carbonate were added, and stirred at a high speed of 10000 r/min for 20 min. The mixture obtained was placed into an aging tank, and rolled for 16 h at 140° C., to provide a drilling fluid composition.

Comparative Example 2

The production process according to comparative example 1 was repeated, except that the substituted glucoside component produced in example 8 was used in place of the substituted glucoside component produced in example 4, to provide a drilling fluid composition.

Comparative Example 3

The production process according to comparative example 1 was repeated, except that the substituted glucoside component produced in example 12 was used in place of the substituted glucoside component produced in example 4, to provide a drilling fluid composition.

Comparative Example 4

240 g of the substituted glucoside component produced in example 4 and 520 g of the substituted glucoside component produced in example 8 were mixed with 40 g of water, to formulate an aqueous solution of the base fluid at a weight fraction of 95%;

1.6 g of xanthan gum XC, 1.6 g of high-viscosity polyanionic cellulose sodium salt HV-PAC, 1.6 g of high-viscosity carboxymethylcellulose sodium salt HV-CMC, 1.2 g of polyacrylamide potassium salt KPAM, 12 g of dextrin and 4.8 g of carboxymethyl starch sodium were added into 400 mL of the aqueous solution of the base fluid stated above, and stirred at a high speed of 10000 r/min for 20 min. 16 g of sulfonated lignite, 16 g of sulfonated asphalt, 96 g of potassium formate and 16 g of potassium carbonate were added, and stirred at a high speed of 10000 r/min for 20 min. The mixture obtained was placed into an aging tank, and rolled for 16 h at 140° C., to provide a drilling fluid composition.

Comparative Example 5

The production process according to comparative example 4 was repeated, except that the substituted glucoside component produced in example 12 was used in place of the substituted glucoside component produced in example 8, to provide a drilling fluid composition.

Comparative Example 6

The production process according to comparative example 4 was repeated, except that the substituted glucoside component produced in example 12 was used in place of the substituted glucoside component produced in example 4, to provide a drilling fluid composition.

The drilling fluid compositions provided in examples 24-30 and comparative examples 1-6 were tested for various properties, and the results were shown in Tables 1-2.

The specific test process was as follows:

(1) According to GB/T16783.1-2014, "Petroleum and natural gas industries-Field testing of drillingfluids-Part 1: Water-basedfluids", the apparent viscosity, plastic viscosity, dynamic shear force, static shear force, medium-pressure filtration loss, high-temperature high-pressure filtration loss, salt resistance, calcium resistance, bentonite resistance, water invasion resistance, crude oil resistance and temperature resistance of the drilling fluid composition were tested.

(2) After the drilling fluid composition had been rolled for 16 hours at 190° C., the inhibition property, lubrication property, reservoir protection property and biotoxicity $EC_{50}$ value of the drilling fluid composition were tested:

① According to the process for testing the core recovery rate of the drilling fluid, the primary recovery rate and the relative recovery rate of the core of the drilling fluid composition were tested, the process comprising the specific operations of:

350 mL of the drilling fluid composition was measured into a high-speed stirring cup, stirred at 7000 r/min for 5 min, and poured into an aging tank for later use. Rock debris at 2.0 mm-5.0 mm was dried at 103° C. for 4 h, and cooled to room temperature, after which $G_0$ g of the rock debris was weighed and put into the aging tank to be rolled with the drilling fluid in the aging tank for 16 h at 190° C., cooled, and taken out. The rock debris was recovered using a sieve with a pore diameter of 0.42 mm, dried at 103° C. for 4 h, cooled to room temperature, and weighed for the weight of the rock debris recovered, which was recorded as $G_1$. The weighed rock debris recovered was then put into clear water, rolled for 2 hours at 190° C., cooled and taken out. The rock debris was recovered using a sieve with a pore diameter of 0.42 mm, dried for 4 hours at 103° C., cooled to room temperature, and weighed for the weight of the rock debris recovered, which was recorded as $G_2$. The primary shale recovery rate $R_1$, the secondary shale recovery rate $R_2$ and relative shale recovery rate R:

$R_1 = G_1/G_0 \times 100\%$;

$R_2 = G_2/G_0 \times 100\%$;

$R = R_2/R_1 \times 100\%$.

② The extreme pressure lubrication coefficient of the drilling fluid composition was tested as follows:

using an EP type extreme pressure lubrication instrument provided by Zhengzhou Nanbei instrument design limited company, setting the instrument to operate at 300 r/min for 15 min, and then adjusting the rotating speed to 60 r/min;

immersing the slider of the instrument into the drilling fluid composition, adjusting the value of a torque wrench to be 16.95 N/m, and operating the instrument for 5 min, to read the numerical value displayed on the instrument when the slider was immersed in the drilling fluid composition, wherein a formula for the calculation of the extreme pressure lubrication coefficient was as follows:

$$K = \frac{X \times 31}{34 \times 100}$$

In the above formula, K was the extreme pressure lubrication coefficient, and X was the numerical value displayed on the instrument when the slider was immersed in the drilling fluid composition.

③ The reservoir protection of the drilling fluid composition was tested as follows:

using a Fann-389AP type full-automatic permeability plugging device provided by Beijing Zhonghuitiancheng technology Co., Ltd.; raising the temperature of the full-automatic permeability plugging device to 120° C., loading a rock core in, performing permeation with kerosene, and recording the initial pressure, highest pressure and stable pressure, wherein the confining pressure was 2 MPa higher than the flowing pressure;

carrying out reverse dynamic or static pollution using the drilling fluid composition, receiving liquid with a measuring cylinder, and recording the time used and volume; and then, performing forward permeability with kerosene, and recording the initial pressure, highest pressure and stable pressure;

wherein the ratio of the stable pressure before pollution to the stable pressure after pollution was recovery value of a permeability, reflecting the damage degree of the drilling fluid composition to formation rock.

④ The drilling fluid compositions were tested for biological toxicity according to the following process:

adding the drilling fluid composition into a solution of sodium chloride at a weight concentration of 3%, formulating respectively into 10 mL of sample solutions to be tested at 0 mg·dm³, 5000 mg·dm³, 10000 mg·dm³, 25000 mg·dm³, 50000 mg·dm³ and 100000 mg·dm³, and standing for 60 min; and adding sequentially 10 mg of luminous bacteria T3 powder into the sample solutions to be detected, fully shaking and uniformly mixing, and determining respectively the biotoxicity $EC_{50}$ values 15 min after the luminous bacteria being contacted with the sample solution to be detected, with taking a sodium chloride solution at a weight concentration of 3% as a control.

TABLE 1

Various property data for the drilling fluid compositions provided in examples 24-30

| Test item | Example 24 | Example 25 | Example 26 | Example 27 | Example 28 | Example 29 | Example 30 |
|---|---|---|---|---|---|---|---|
| Apparent viscosity (mPa.s) | 51 | 74 | 85 | 95 | 77 | 89 | 92 |
| Plastic viscosity (mPa.s) | 30 | 44 | 50 | 55 | 40 | 52 | 53 |
| Dynamic shear force (Pa) | 21 | 30 | 35 | 40 | 37 | 47 | 39 |
| Static shear force (Pa/Pa) | 4.0/9.0 | 7.0/10.0 | 8.0/15.0 | 9.0/18.0 | 7.5/12.0 | 9.0/16.5 | 10.0/18.5 |

TABLE 1-continued

Various property data for the drilling fluid compositions provided in examples 24-30

| Test item | Example 24 | Example 25 | Example 26 | Example 27 | Example 28 | Example 29 | Example 30 |
|---|---|---|---|---|---|---|---|
| Medium pressure filtration loss | 0 | 0 | 0 | 0 | 0 | 0 | 0 |
| High-temperature high-pressure filtration loss | 2.0 | 1.8 | 1.6 | 1.0 | 2.0 | 1.8 | 1.8 |
| Water Activity | 0.48 | 0.46 | 0.42 | 0.41 | 0.45 | 0.44 | 0.42 |
| Salt resistance | Saturated | Saturated | Saturated | Saturated | Saturated | Saturated | Saturated |
| Calcium resistance | 30% | 30% | 30% | 30% | 30% | 30% | 30% |
| Bentonite resistance | 30% | 30% | 30% | 30% | 30% | 30% | 30% |
| Water invasion resistance | 60% | 60% | 60% | 60% | 60% | 60% | 60% |
| Crudeoil resistance | 40% | 40% | 40% | 40% | 40% | 40% | 40% |
| Temperature resistance | 190° C. | 190° C. | 190° C. | 190° C. | 190° C. | 190° C. | 190° C. |
| Primary recovery of core (%) | 99.9 | 99.9 | 100 | 100 | 99.9 | 99.9 | 100 |
| Relative recovery of core (%) | 99.9 | 99.9 | 99.9 | 99.9 | 99.9 | 99.9 | 99.9 |
| Extreme pressure lubrication coefficient | 0.039 | 0.034 | 0.033 | 0.022 | 0.036 | 0.032 | 0.034 |
| Dynamic permeability recovery (%) | 95.52 | 95.46 | 96.16 | 96.85 | 95.24 | 95.43 | 95.69 |
| Static permeability recovery (%) | 98.72 | 99.48 | 99.21 | 99.55 | 98.87 | 98.74 | 99.50 |
| Biotoxicity $EC_{50}$ (mg/L) | 739800 | 747900 | 754200 | 759800 | 745400 | 746200 | 748500 |

TABLE 2 various property data for the drilling fluid compositions provided in comparative examples 1-6

| Test item | Comparative example 1 | Comparative example 2 | Comparative example 3 | Comparative example 4 | Comparative example 5 | Comparative example 6 |
|---|---|---|---|---|---|---|
| Apparent viscosity (mPa.s) | 35.5 | 37.5 | 38.5 | 37.5 | 38.5 | 39.5 |
| Plastic viscosity (mPa.s) | 30 | 32 | 32 | 31 | 31 | 32 |
| Dynamic shear force (Pa) | 5.5 | 5.5 | 6.5 | 6.5 | 7.5 | 7.5 |
| Static shear force (Pa/Pa) | 2.0/3.0 | 2.0/4.0 | 3.0/5.0 | 3.0/4.0 | 3.0/6.0 | 4.0/8.0 |
| Medium pressure filtration loss | 2.6 | 2.8 | 2.4 | 2.4 | 2.2 | 2.2 |
| High-temperature high-pressure filtration loss | 13.8 | 13.6 | 13.2 | 13.0 | 12.8 | 12.2 |
| Water Activity | 0.74 | 0.70 | 0.68 | 0.64 | 0.63 | 0.62 |
| Salt resistance | 20% | 21% | 22% | 23% | 23% | 24% |
| Calcium resistance | 12% | 13% | 13% | 13% | 14% | 15% |
| Bentonite resistance | 14% | 15% | 16% | 16% | 17% | 18% |
| Water invasion resistance | 32% | 32% | 33% | 35% | 35% | 38% |
| Crudeoil resistance | 24% | 24% | 24% | 25% | 26% | 27% |
| Temperature resistance | 140° C. | 145° C. | 146° C. | 148° C. | 150° C. | 155° C. |
| Primary recovery of core (%) | 92.9 | 93.2 | 94.4 | 94.9 | 95.1 | 95.8 |
| Relative recovery of core (%) | 95.6 | 95.9 | 96.3 | 96.7 | 97.4 | 97.8 |
| Extreme pressure lubrication coefficient | 0.093 | 0.088 | 0.086 | 0.082 | 0.076 | 0.069 |

TABLE 2-continued various property data for the drilling fluid compositions provided in comparative examples 1-6

| Test item | Comparative example 1 | Comparative example 2 | Comparative example 3 | Comparative example 4 | Comparative example 5 | Comparative example 6 |
|---|---|---|---|---|---|---|
| Dynamic permeability recovery (%) | 90.56 | 90.58 | 90.58 | 90.69 | 90.97 | 91.23 |
| Static permeability recovery (%) | 92.78 | 92.82 | 92.89 | 93.34 | 93.54 | 93.87 |
| Biotoxicity $EC_{50}$ (mg/L) | 488600 | 485700 | 489800 | 491200 | 493400 | 497300 |

As can be seen from Table 1, the drilling fluid compositions according to the present invention (e.g., examples 24-30) generally had the following properties: an apparent viscosity of 51-95 mPa·s, a plastic viscosity of 30-55 mPa·s, a dynamic shear force of 21-40 Pa, astatic shear force of 4-9/9-18, a medium-pressure filtration loss of 0 mL, a high-temperature and high-pressure filtration loss of 1.0-2.0 mL, a salt resistance of each "saturated", a calcium resistance of each 300, a bentonite resistance of each 30%, a water invasion resistance of each 60%, a crude oil resistance of each 40%, and a temperature resistance of each 190° C.; a primary recovery rate of the rock core of >99%, and a relative recovery rate of the rock core of each 99.9%; an extreme pressure lubrication coefficient of 0.022-0.039; a water activity <0.50; a dynamic permeability recovery value of >95%, and a static permeability recovery value of >98%; and a biotoxicity $EC_{50}$ value of 739800 mg/L-759800 mg/L.

From the examples, it could be seen that the drilling fluid composition according to the invention had good temperature resistance, excellent filtration loss reduction and pollution resistance: the temperature resistance as high as 190° C., the medium pressure filtration loss of 0 mL, the high-temperature high-pressure filtration loss of ≤2.0 mL, the salt resistance as high as saturated, the calcium resistance of 30%, the soil resistance of 30%, the water erosion resistance of 60%, and the crude oil resistance of 40%; but also had excellent inhibition property, good lubricating property and reservoir protection property, without biotoxicity: the primary core recovery rate of >99%, the relative core recovery rate of more than 99%, the extreme pressure lubrication coefficient was <0.04, the dynamic permeability recovery value of >95%, the static permeability recovery value of >98%, and the biotoxicity $EC_{50}$ value of >730000 mg/L (an $EC_{50}$ value of >30000 mg/L representing nontoxic).

The drilling fluid composition according to the present invention was used for drilling construction of highly water-sensitive shale, strata easily to collapse such as mudstone and shale oil gas horizontal wells:

(1) The drilling fluid composition according to the present invention was applied to the field of the second spud kick-off section of Pingping-6 well in the continental shale gas block of Shaanxi Yanchang Petroleum Chemical Engineering Co., Ltd.; and the results showed that the drilling fluid composition achieved outstanding effects: the drilling fluid composition having excellent anti-collapse property, high capacity of holding solid-phase cleaning agent, excellent lubricating and anti-blocking property, and significant advantage in environmental protection; the hole diameter expansion rate of the applied well section being only 4.78% (the adjacent well Pingping-3 well section using potassium chloride polymer as drilling fluid, resulting in a hole diameter expansion rate of >20%).

(2) The drilling fluid composition according to the present invention was applied to Well Songyeyou-2HF in Songliao basin of northeast China; and the result showed that the drilling fluid composition had an action mechanism and properties similar to those of oil base drilling fluid, and had the environmental protection advantage absent by the oil base drilling fluid; after use in the well, the drilling fluid showed high inhibition and anti-collapse properties, high capacity of holding solid phase and high cleaning capability, and excellent lubrication and anti-blocking property; the well wall was always kept stable, without collapse or dropping, the tripping was smooth, the property of the drilling fluid was stable, the drilling fluid showed better control to bentonite content and other harmful solid phases, so as to be easily maintained; and the drilling fluid had good lubricating and anti-collapse effects, without occurrences of complex conditions including supporting pressure, drill sticking and the like under the well. The process comprised specifically the steps of:

the soft mudstone stratum of the Nenjiang Formation and the Yaojia Formation were open soaked for 100d (with a collapse period of 7-10 d), and the soft mudstone stratum of the Qingshan Formation was open soaked for 87d (with a collapse period of 21 d). The well wall was kept stable, the well wall collapse caused by the fact that the drilling fluid hydrates the mudstone stratum was avoided, where the drilling fluid composition worked same as an oil-based drilling fluid, excluding the concept of a collapse period. In the construction process of the Well Songyeyou-2HF using the drilling fluid composition, the tripping out drilling friction resistance was 3-5t, and the tripping in friction resistance was 1-3t, representing good lubricating anti-sticking effects. The whole orientation section did not comprise any pressure supporting phenomenon, and the orientation process was very smooth. The in-situ measurement result for bentonite content of the drilling fluid composition was 6.4 g/L. After a period of drilling, the in-situ measurement result for bentonite content of the drilling fluid composition was reduced to 5.36 g/L. The in-situ measurement result for bentonite content of the drilling fluid was extremely low and showed a reducing trend, ensured that the drilling fluid had a good flow form, the external undesired solid phase could not invade into the drilling fluid system, and the cleanness of the drilling fluid was always kept.

In conclusion, the drilling fluid composition according to the present invention has excellent green environmental protection property, anti-collapse property, lubrication and anti-sticking properties and solid phase cleaning capacity, and can effectively ensure the green, safe and high-efficient drilling construction for highly water-sensitive mudstone, strata easily to collapse such as mudstone and shale oil-gas horizontal wells.

The invention claimed is:
1. A mixture comprising a compound X, a compound Y, and a compound Z, wherein:
the compound X is one or more compounds selected from the group consisting of compounds represented by formula (II-1) and compounds represented by formula (II-2),
the compound Y is one or more compounds selected from the group consisting of compounds represented by formula (III-1), compounds represented by formula (III-2), and compounds represented by formula (III-3), and the compound Z is one or more compounds selected from the group consisting of compounds represented by formula (IV-1), compounds represented by formula (IV-2), and compounds represented by formula (IV-3),

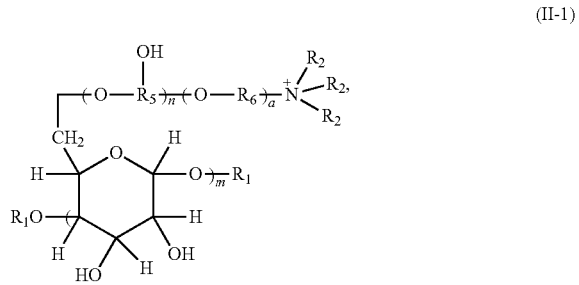
(II-1)

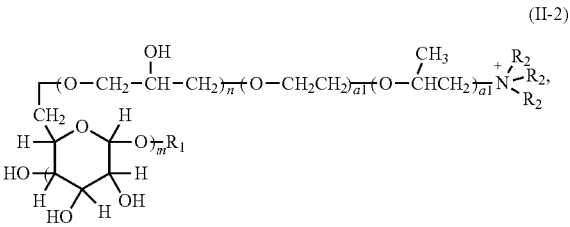
(II-2)

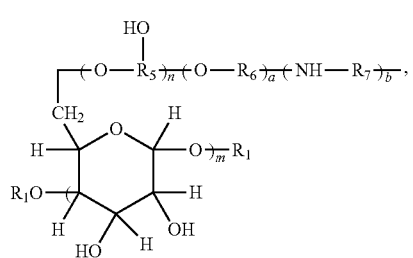
(III-1)

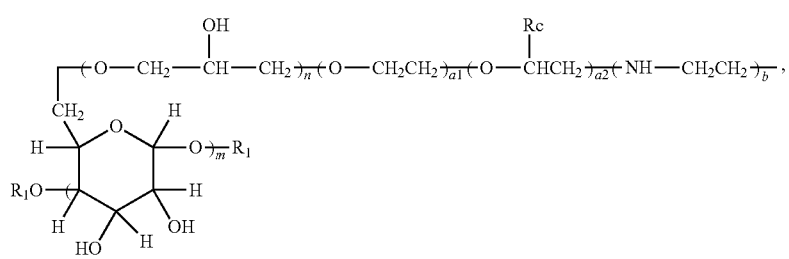
(III-2)

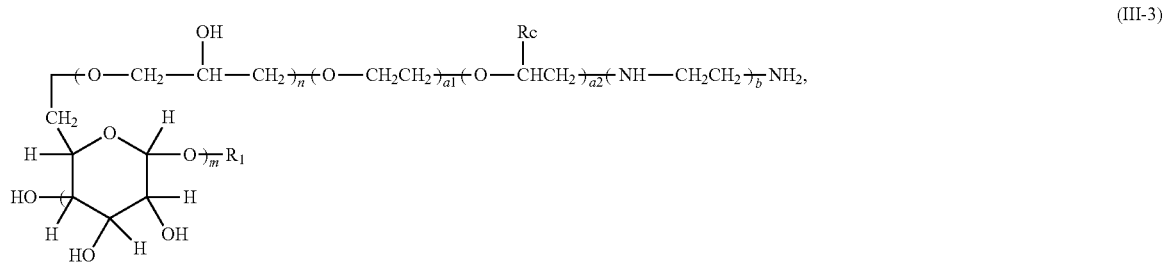
(III-3)

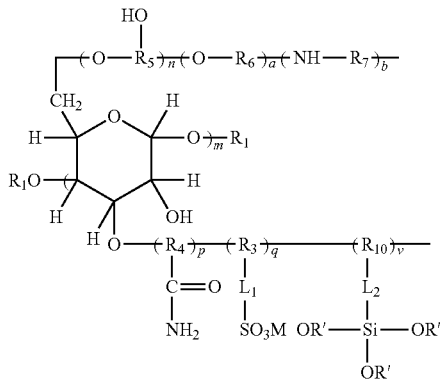

(IV-1)

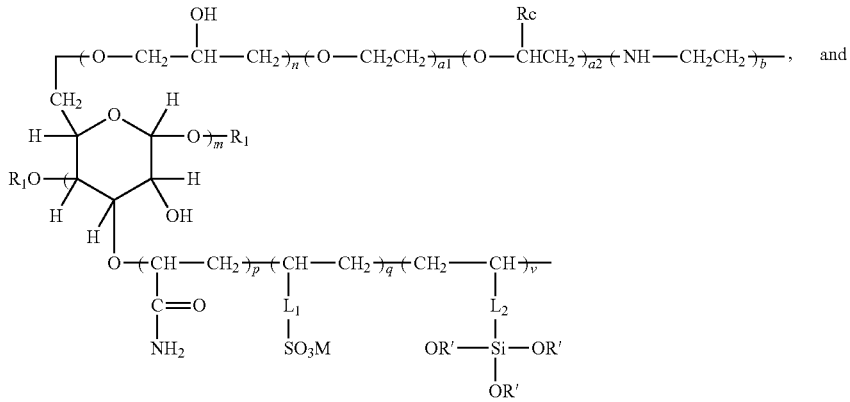

(IV-2)

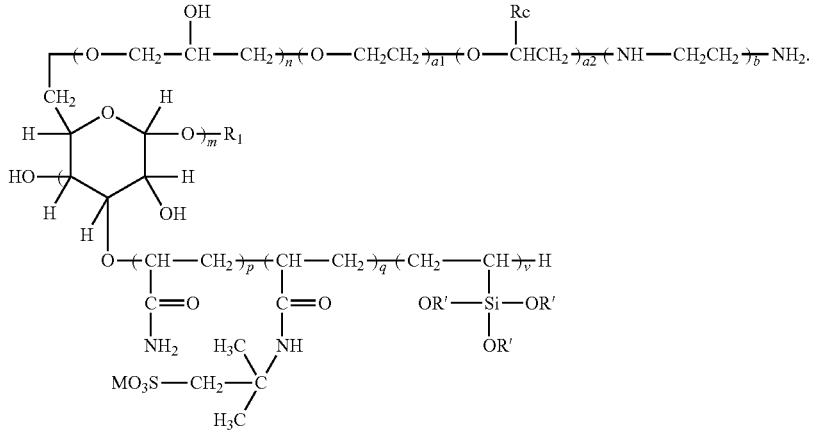

(IV-3)

wherein substituent groups in formulae (II-1), (II-2), (II-3), (III-1), (III-2), (III-3), (IV-1), (IV-2), and (IV-3) is same or different from each other, $R_1$ is selected from the group consisting of hydrogen and C1-20 linear or branched alkyls, $R_2$ is a C1-20 linear or branched alkyl, $R_3$ is a C2-6 linear or branched trivalent alkyl, $R_4$ is a C2-6 linear or branched alkylene group, $R_5$ is a $C_{3-6}$ linear or branched trivalent alkyl, $R_6$ is a C2-8 linear or branched alkylene, $R_7$ is a C2-6 linear or branched alkylene, $R'$ is a $C_{1-4}$ linear or branched alkyl, Rc is a C1-5 linear or branched alkyl, $R_{10}$ is a C2-6 linear or branched alkylene, $L_1$ is selected from a single bond, C2-10 linear or branched alkylenes, —C(=O)—C2-10 linear or branched alkylenes, —C(=O)O—C2-10 linear or branched alkylene-C(=O)NH—C2-10 linear or branched alkylenes, C2-5 linear or branched alkylene-C(=O)—C2-5 linear or branched alkylenes, C2-5 linear or branched alkylene-C(=O)O—C2-5 linear or branched alkylenes, C2-5 linear or branched alkylene-C(=O)NH—C2-5 linear or branched alkylenes, $L_2$ is a single bond or a C2-10 linear or branched alkylenes, M is hydrogen, an alkali metal, or ammonium ($NH_4$), m is an integer of 1-3, n is a number ranging from 0 to 3, a is a number ranging from 0 to 6, b is a number ranging from 1 to 5, a1 is a number ranging from 0 to 3, and a2 is a number ranging from 0 to 3, wherein a=0 and b=1 do not occur simultaneously, or a1=0, a2=0, and b=1 do not occur simultaneously, p is a number ranging from 2 to 30, q is a number ranging from 0 to 30, and v is a number ranging from 0 to 30.

2. The mixture according to claim 1, wherein:

in the compound X, a1=0, a2=0, and n=1, in the compound Y, n is 0, Rc is methyl, a1 is a number ranging from 1 to 2, a2 is a number ranging from 1 to 2, b is a number ranging from 2 to 3, and m is 1, and in the compound Z, n is 0, a1 is 0, a2 is a number ranging from 1 to 2, b is a number ranging from 2 to 4, and v=0, and wherein a weight ratio of a compound X, a compound Y, and a compound Z is 20-30:30-40:10-25.

3. The mixture according to claim 1, having a cationicity of from 0.10 to 0.80 mmol/g, and/or an amine value of from 0.40 to 1.65 mmol/g.

4. A drilling fluid composition, comprising a drilling fluid base fluid that comprises the mixture according to claim 1 and water.

5. The drilling fluid composition according to claim 4, wherein the mixture is present in an amount of 60 to 95 wt %, based on 100 wt % of the drilling fluid base fluid.

6. A process for producing a drilling fluid composition, comprising mixing the mixture according to claim 1, water, and optionally at least one treating agent.

7. The mixture according to claim 1, wherein the group

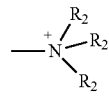

has a counter anion, and/or $R_2$ is a C1-10 linear or branched alkyl.

8. The mixture according to claim 7, wherein the counter anion of group

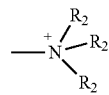

is a halogen anion, and/or $R_2$ is a C1-4 linear or branched alkyl.

9. The mixture according to claim 1, wherein $R_4$ is ethylene or propylene.

10. The mixture according to claim 1, wherein $R_7$ is ethylene or propylene.

11. The mixture according to claim 1, wherein $R_5$ is trivalent propyl or trivalent butyl, and/or R6 is ethylene or propylene.

12. The mixture according to claim 1, wherein $R_3$ is ethylene or propylene, and/or $L_1$ is a linking group having no more than 10 carbon atoms, and/or $R_{10}$ is ethylene or propylene, and/or $L_2$ is a linking group having no more than 10 carbon atoms, and/or R' is methyl or ethyl.

13. The mixture according to claim 1, wherein $L_1$ is a single bond, a C2-10 linear or branched alkylene, a —C(=O)—C2-10 linear or branched alkylene, a —C(=O)O—C2-10 linear or branched alkylene, a —C(=O)NH—C2-10 linear or branched alkylene, a C2-5 linear or branched alkylene-C(=O)—C2-5 linear or branched alkylene, a C2-5 linear or branched alkylene-C(=O)O—C2-5 linear or branched alkylene, a C2-5 linear or branched alkylene-C(=O)NH—C2-5 linear or branched alkylene, and/or L2 is a single bond or a C2-10 linear or branched alkylene.

14. The mixture according to claim 13, wherein $L_1$ is —C(=O)NH—C2-10 linear or branched alkylene, and/or L2 is a single bond.

15. The mixture of according to claim 1, wherein Rc is a C1-5 linear or branched alkyl or C1-4 linear or branched alkyl, and/or $R_5$ is trivalent propyl or trivalent butyl.

16. The mixture according to claim 1, wherein $R_1$ are each independently selected from the group consisting of hydrogen and C1-10 linear or branched alkyl.

17. The mixture according to claim 1, wherein: in the formula (II-2), a1=0, a2=0, and n=1, and/or in the formula (III-2) or formula (III-3), n is 0, Rc is methyl, a1 is a number ranging from 0 to 3 or from 1 to 2, a2 is a number ranging from 0 to 3 or from 1 to 2, b is a number ranging from 1 to 4 or from 2 to 3, and m is 1, and/or in the formula (IV-2) or formula (IV-3), n is 0, a1 is 0, a2 is a number ranging from 1 to 3 or from 1 to 2, b is a number ranging from 1 to 5 or from 2 to 4, and v=0.

18. The mixture according to claim 3, having a cationicity of from 0.25 to 0.50 mmol/g, and/or an amine value of from 0.83 to 1.32 mmol/g.

19. The composition according to claim 4, further comprising at least one treating agent in an amount of 18.3 to 41.7 g, based on 100 mL of the drilling fluid base fluid.

20. The process according to claim 6, comprising firstly mixing the mixture with water to obtain an aqueous mixture, and then mixing the aqueous mixture with at least one treating agent, and carrying out an aging treatment at a temperature in the range of 120-200° C. for a duration of 10-30 hours.

21. The drilling fluid composition according to claim 4, further comprising at least one treating agent is present in an amount of 10 to 70 g, based on 100 mL of the drilling fluid base fluid.

22. The drilling fluid composition according to claim 4, further comprising at least one treating agent selected from the group consisting of a tackifier, a flow form modifier, a filtration loss reducer, a high temperature stabilizer, a plugging agent, an inhibition enhancer, and a pH adjuster.

* * * * *